United States Patent [19]

Lizell

[11] Patent Number: 5,231,583
[45] Date of Patent: * Jul. 27, 1993

[54] METHOD AND APPARATUS FOR DYNAMIC LEVELING OF A VEHICLE USING AN ACTIVE SUSPENSION SYSTEM

[75] Inventor: Magnus B. Lizell, Danderyd, Sweden

[73] Assignee: Monroe Auto Equipment Company

[*] Notice: The portion of the term of this patent subsequent to Mar. 17, 2009 has been disclaimed.

[21] Appl. No.: 852,413

[22] Filed: Mar. 16, 1992

Related U.S. Application Data

[63] Continuation of Ser. No. 535,362, Jun. 8, 1990, Pat. No. 5,097,419.

[51] Int. Cl.$^5$ .............. B60G 17/015; B60G 17/056
[52] U.S. Cl. ........................... 364/424.05; 280/707; 280/714
[58] Field of Search ............... 364/424.05; 280/707, 280/709, 714, 6.1, 840; 188/282, 299

[56] References Cited

U.S. PATENT DOCUMENTS

| | | | |
|---|---|---|---|
| 4,898,257 | 2/1990 | Brandstadter | 280/707 X |
| 5,062,660 | 11/1991 | Satoh et al. | 280/707 |
| 5,082,309 | 1/1992 | Schützner et al. | 280/707 X |
| 5,089,966 | 2/1992 | Fukushima et al. | 364/424.05 |
| 5,097,419 | 3/1992 | Lizell | 364/424.05 |

Primary Examiner—Parshotam S. Lall
Assistant Examiner—Ed Pipala
Attorney, Agent, or Firm—Harness, Dickey & Pierce

[57] ABSTRACT

A method and apparatus for dynamically leveling the attitude of a vehicle using a low power fully active suspension system. The suspension system includes a hydraulic actuator operably connected at each corner of the vehicle between sprung and unsprung portions thereof, sensors for detecting movement of the sprung and unsprung portions of the motor vehicle and for deriving a force signal for each actuator in response thereto, and a valving arrangement for causing the hydraulic actuator to generate a desired output force in response to the force signal. The valving arrangement has a first valving that is operable for generating the output force by selectively varying the damping characteristics of the hydraulic actuator when the force signal is within a predetermined range. The valving arrangement also includes second valving for selectively controlling the supply and discharge of hydraulic fluid between the hydraulic actuator and a fluid pressure source for generating the output force when the force signal is outside of the predetermined range. Thus, the lower power fully active suspension system is adapted to produce the desired output force through selective actuation of the first and second valvings for limiting the duty cycle and power requirements of the fluid pressure source.

19 Claims, 17 Drawing Sheets $F_{actuator} = F_{acc} + F_{piston}$ $F_{piston} = C \cdot Q_{piston}$ $Q_{piston} = Q_{rel} + Q_{serv}$ $Q_{rel} = V_{rel} \cdot A_{piston}$ $F_{acc} = P_{acc} \cdot A_{rod}$ $P_{acc} = K_{onst} / V_{acc}{}^k$ $F_{piston}$ = Actuator Force From Piston
$C$ = Characteristic Of Damper Valve
$C_{com}$ = Commanded Setting Of Valve
$Q_{piston}$ = Hydr. Flow Through Piston
$Q_{rel}$ = Hydr. Flow By Susp. Vel.
$Q_{serv}$ = Hydr. Flow From Servo Valve
$Q_{com}$ = Commanded Flow
$F_{acc}$ = Actuator Force By Acc. Press.
$P_{acc}$ = Accumulator Pressure
$V_{acc}$ = Volume Of Gas In Acc.

Principle Layout Of The Low Power Active Suspension Hardware

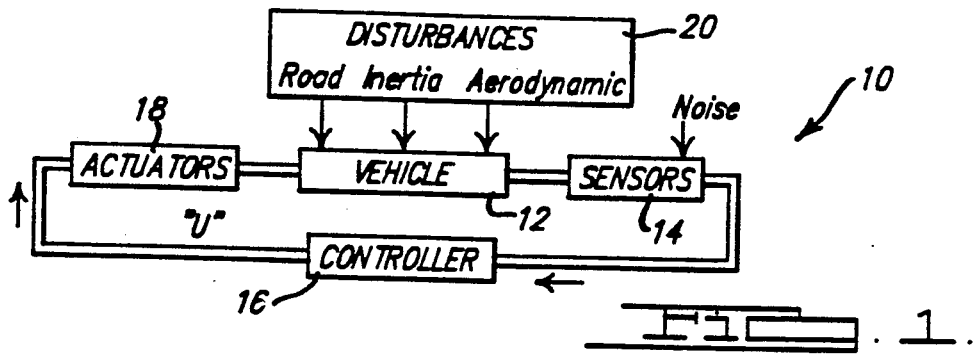
FIG. 1.
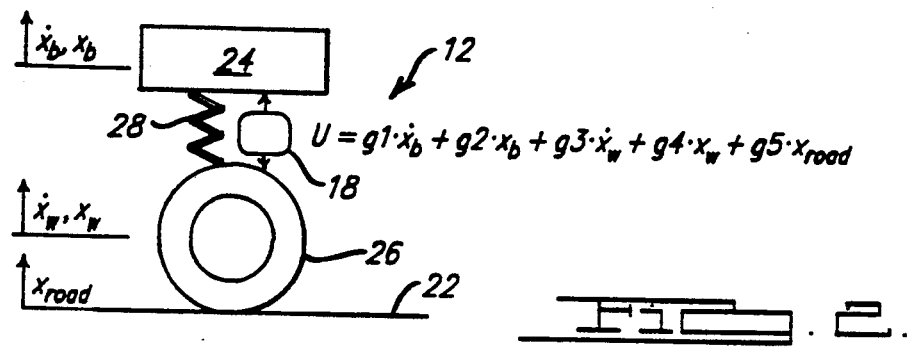
FIG. 2.
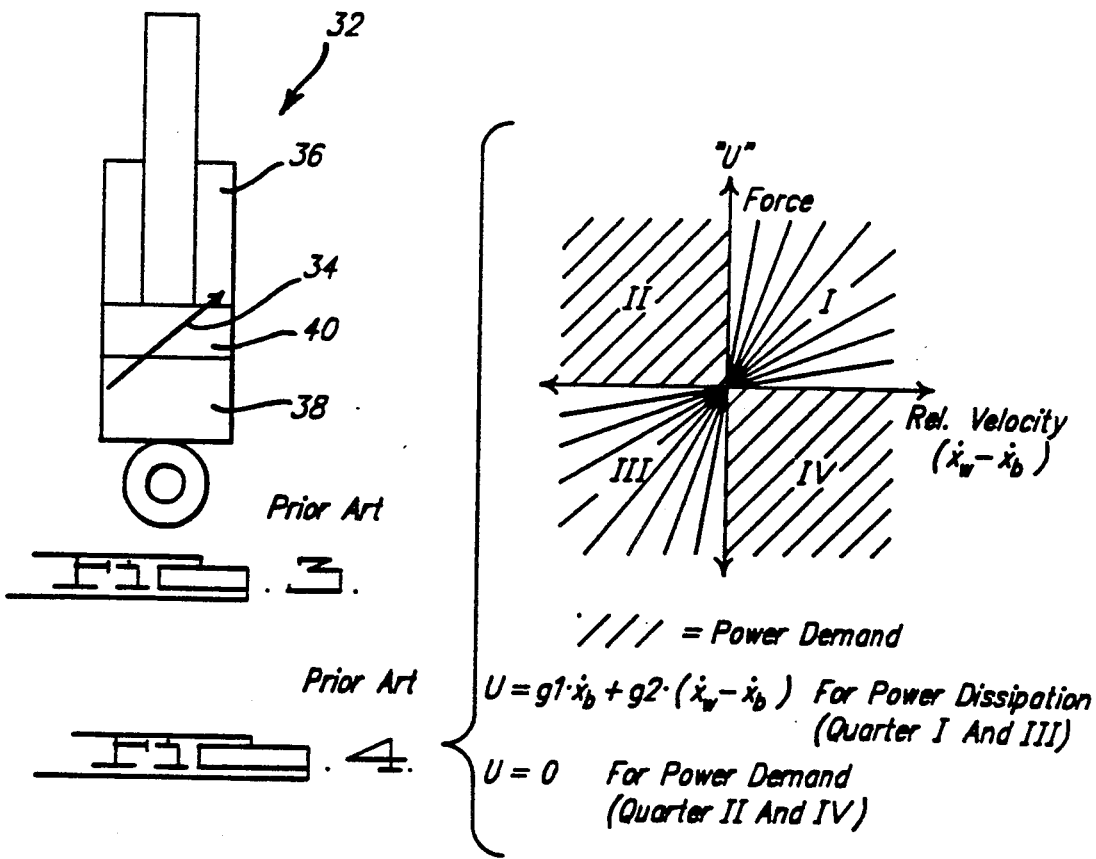
Prior Art
FIG. 3.
Prior Art
FIG. 4.

$U = g1 \cdot \dot{x}_b + g2 \cdot x_b$ $U = g1 \cdot \dot{x}_b + g2 \cdot x_b + g3 \cdot \dot{x}_w + g4 \cdot x_w + g5 \cdot x_{road}$

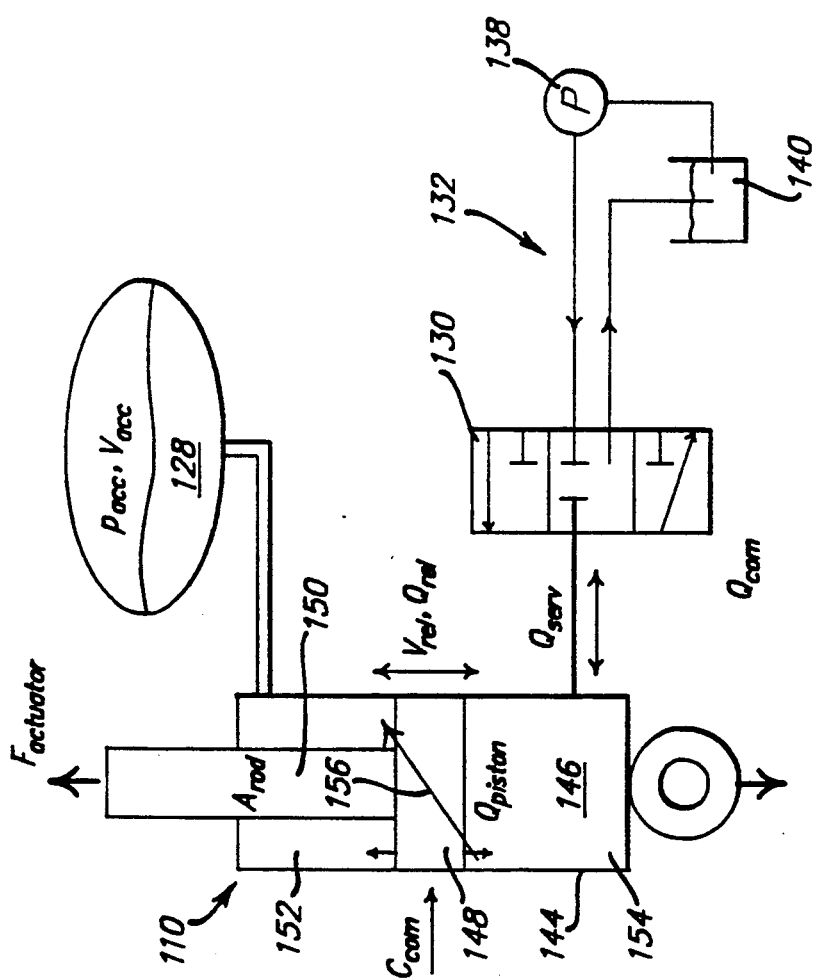

FIG. 5

Principle Layout Of The Low Power Active Suspension Hardware $$F_{actuator} = F_{acc} + F_{piston}$$
$$F_{piston} = C \cdot Q_{piston}$$
$$Q_{piston} = Q_{rel} + Q_{serv}$$
$$Q_{rel} = V_{rel} \cdot A_{piston}$$
$$F_{acc} = P_{acc} \cdot A_{rod}$$
$$P_{acc} = Konst / V_{acc}^{k}$$

$F_{piston}$ = Actuator Force From Piston
$C$ = Characteristic Of Damper Valve
$C_{com}$ = Commanded Setting Of Valve
$Q_{piston}$ = Hydr. Flow Through Piston
$Q_{rel}$ = Hydr. Flow By Susp. Vel.
$Q_{serv}$ = Hydr. Flow From Servo Valve.
$Q_{com}$ = Commanded Flow $F_{acc}$ = Actuator Force By Acc. Press.
$P_{acc}$ = Accumulator Pressure
$V_{acc}$ = Volume Of Gas In Acc.

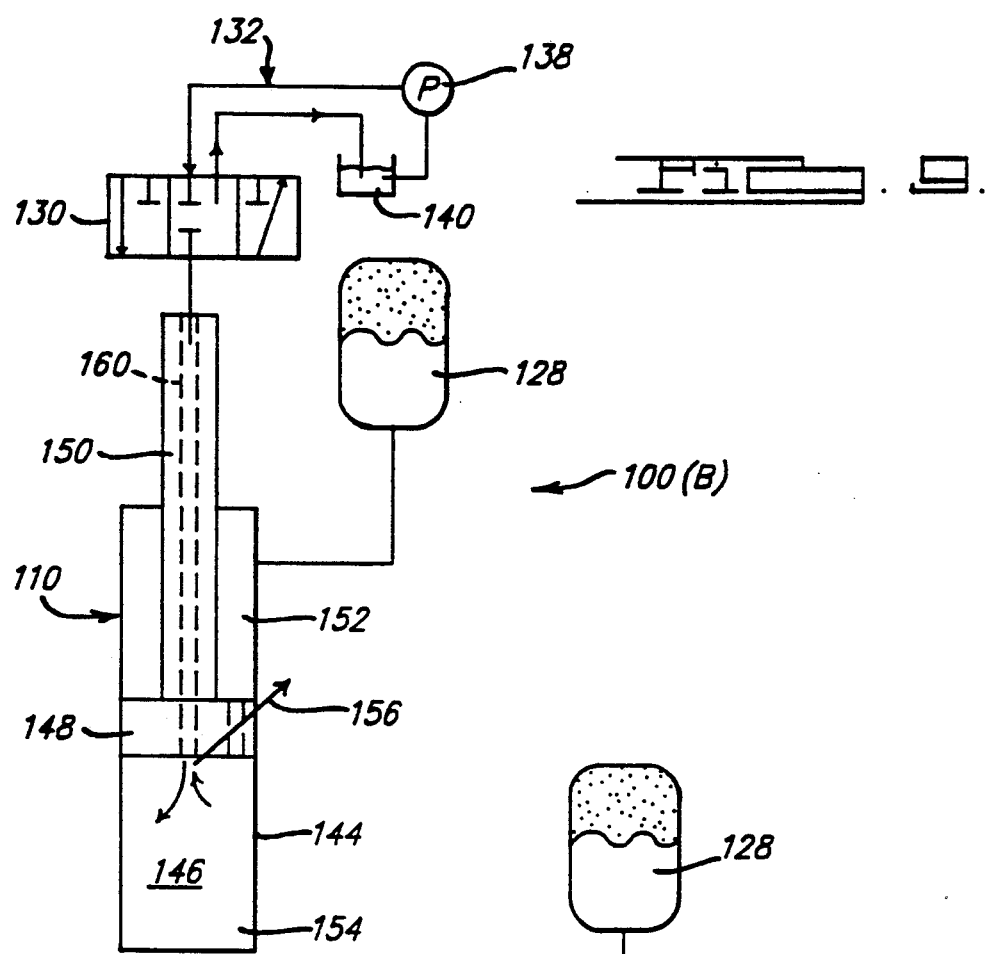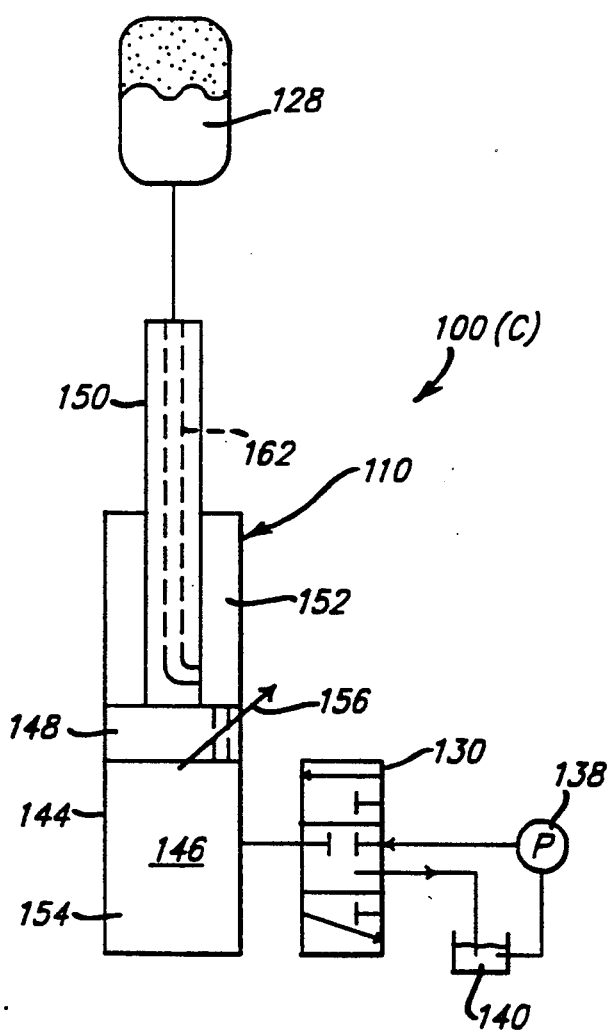

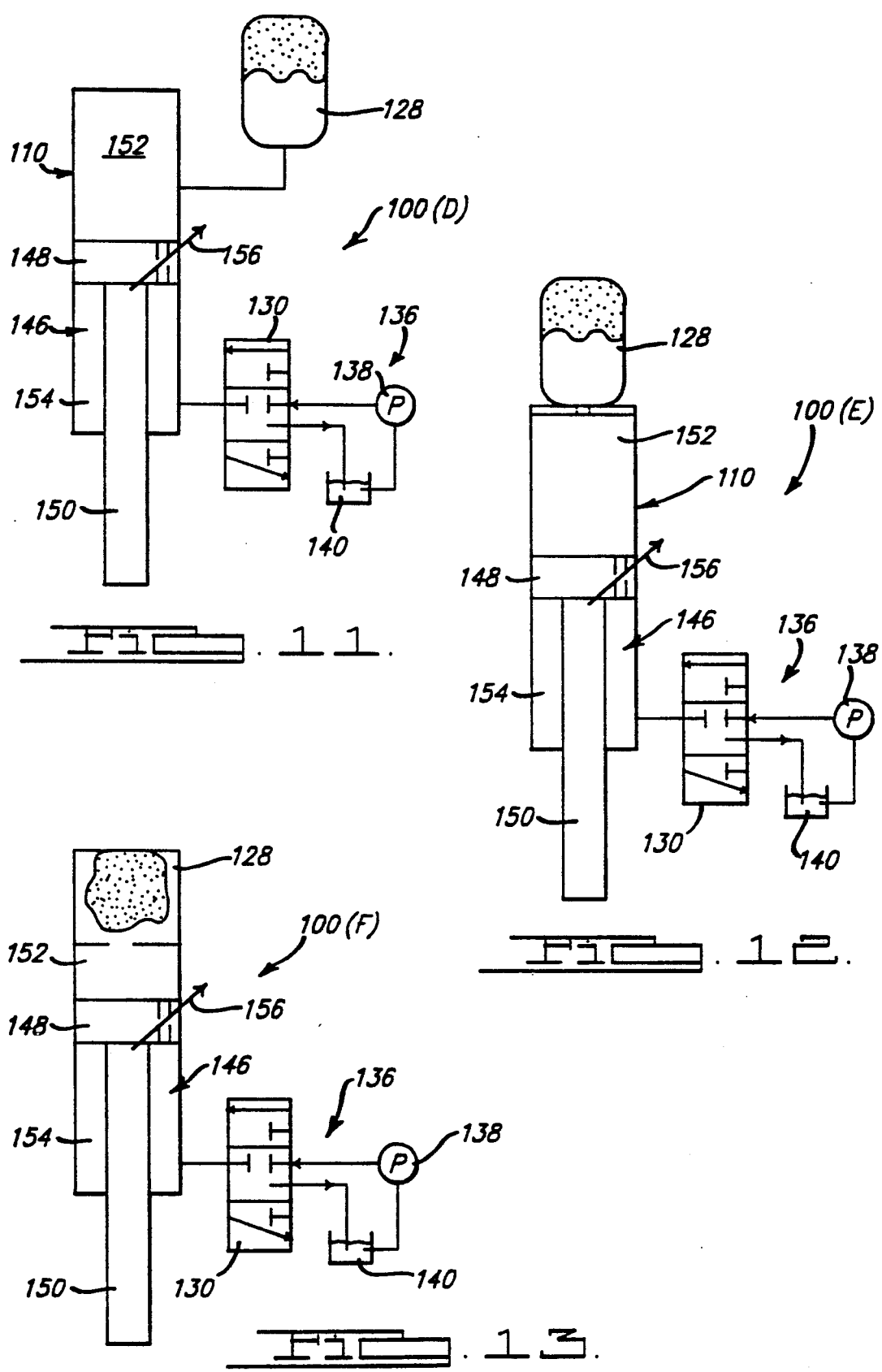

$$U_{dyn} = -Gx$$
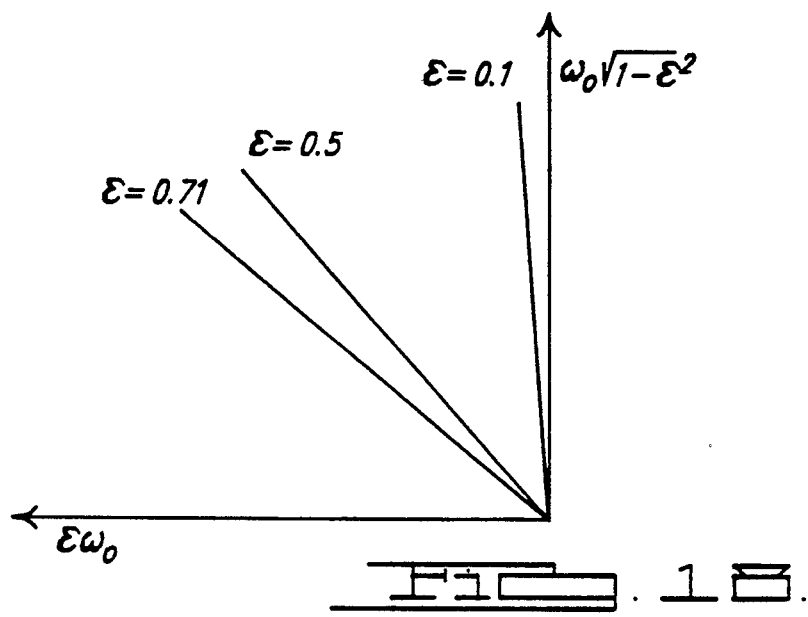
FIG. 17.
FIG. 18.
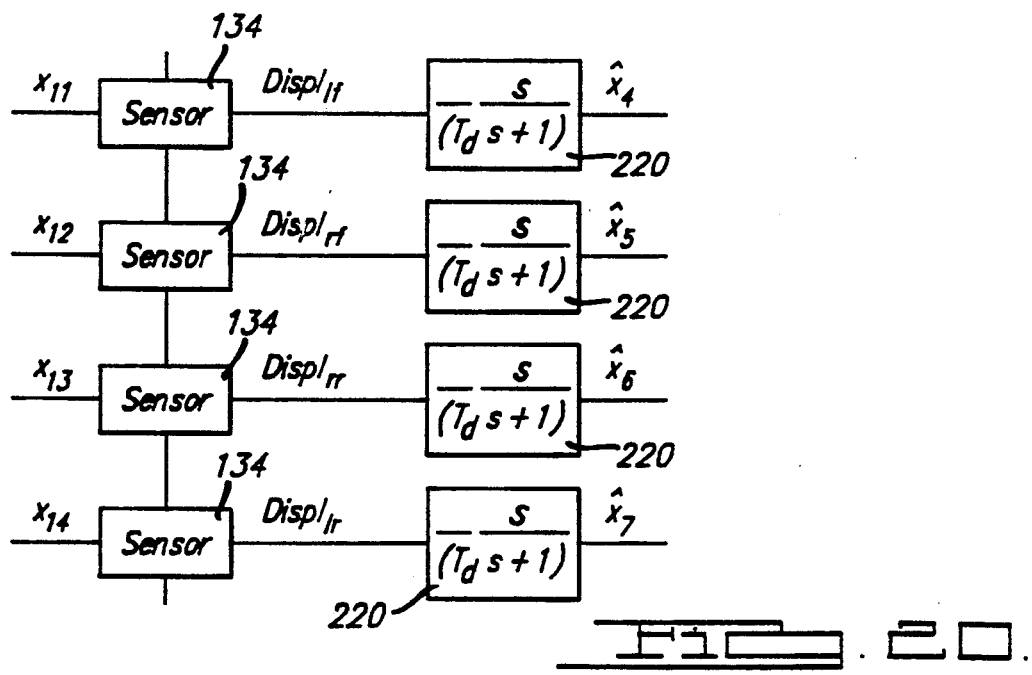
FIG. 20.

|  | A: Passive | | B: Active Feedback $g_{soft}$ | | C: Active Feedback $g_{firm}$ | |
|---|---|---|---|---|---|---|
|  | $\varepsilon\omega_0$ | $\omega_0\sqrt{1-\varepsilon^2}$ | $\varepsilon\omega_0$ | $\omega_0\sqrt{1-\varepsilon^2}$ | $\varepsilon\omega_0$ | $\omega_0\sqrt{1-\varepsilon^2}$ |
| Heave: | −1.60 | ±5.58i | −4.23 | ±4.23i | −4.45 | ±4.47i |
| Pitch: | −1.83 | ±6.26i | −4.46 | ±4.46i | −4.70 | ±4.72i |
| Roll: | −2.68 | ±15.5i | −12.2 | ±12.3i | −14.6 | ±15.6i |
| Wheel: | −22.0 | ±70.4i | −7.74 | ±73.7i | −37.4 | ±59.7i |
| Wheel: | −20.4 | ±71.0i | −7.75 | ±73.7i | −37.4 | ±59.4i |
| Wheel: | −22.6 | ±78.6i | −8.1 | ±72.6i | −37.3 | ±64.6i |
| Wheel: | −21.0 | ±76.0i | −7.46 | ±74.3i | −35.5 | ±47.3i |

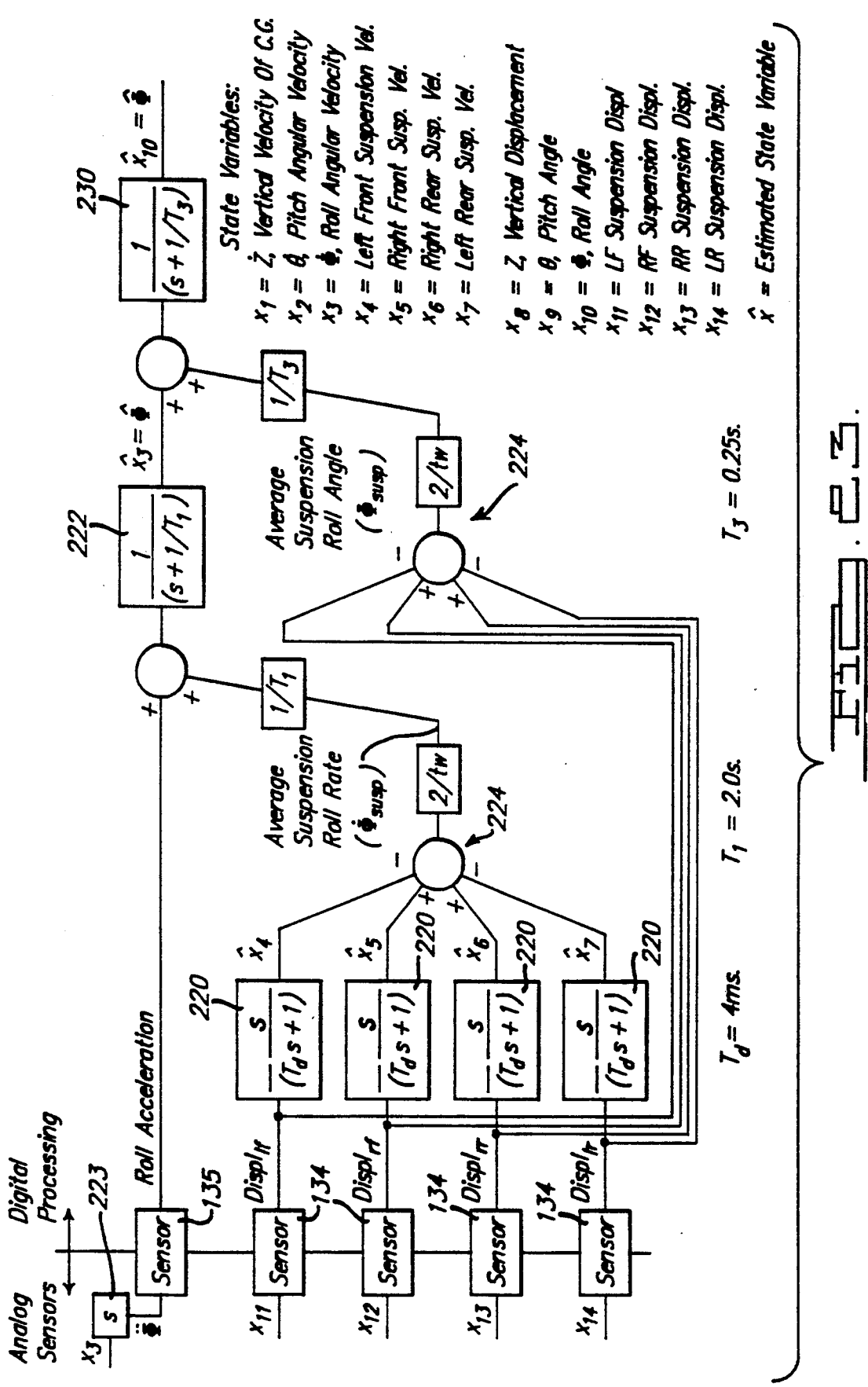

Time History Of Alfa When Passing A Bump At 40 km/h.
The System Is In Rest At Time 0.

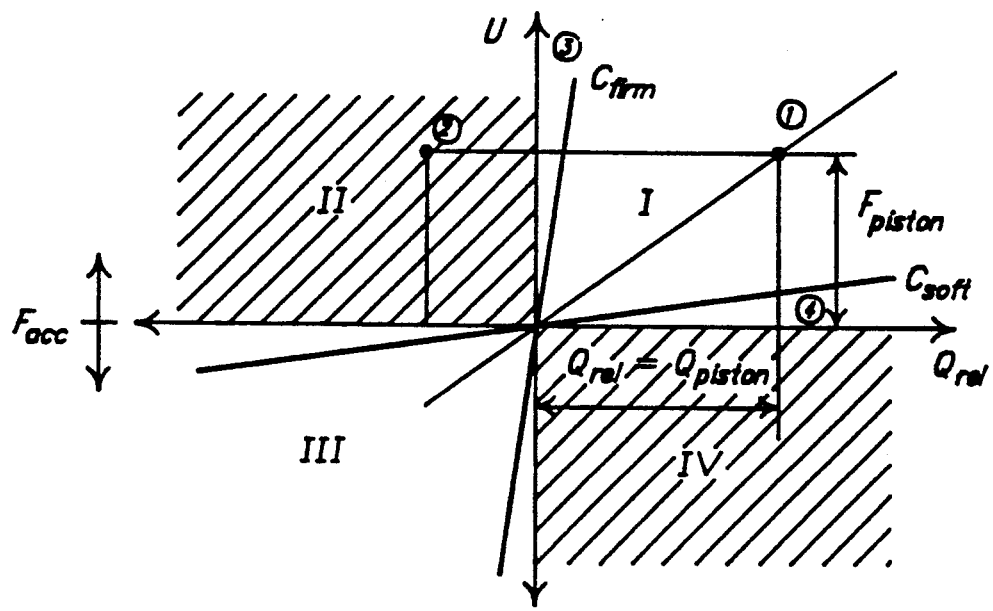
The Commanded Force U Vs. The Relative Flow.
$Q_{serv} = 0 \rightarrow Q_{piston} = Q_{rel}$
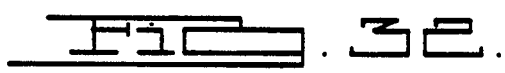
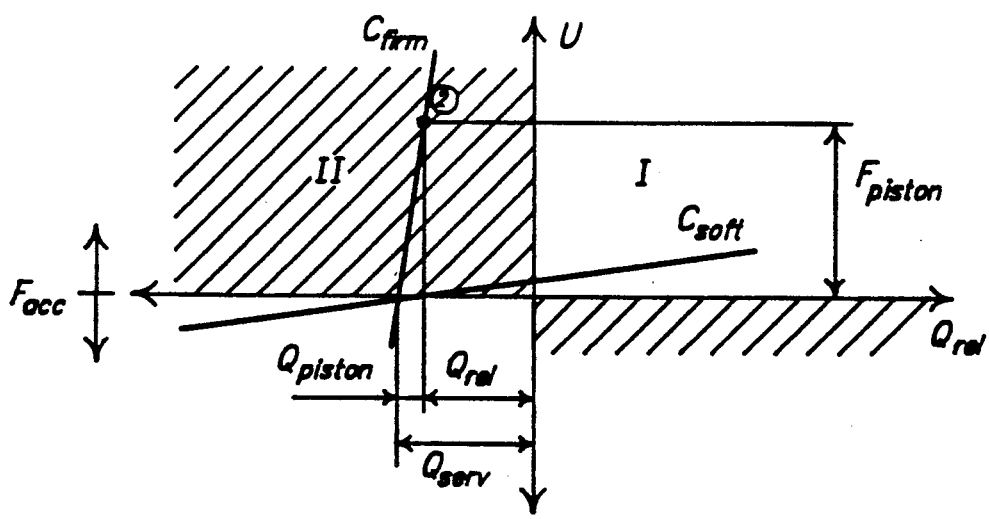
The Commanded Force U Vs. The Relative Flow.
$Q_{piston} = Q_{rel} + Q_{serv}$
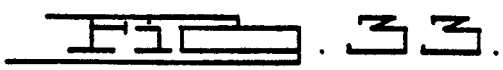

Control Scheme For Left Front Actuator

The Gain Adjustment Related To Requirement.

The Control Of The Servo Valve. (^ Indicates Estimated Variables)

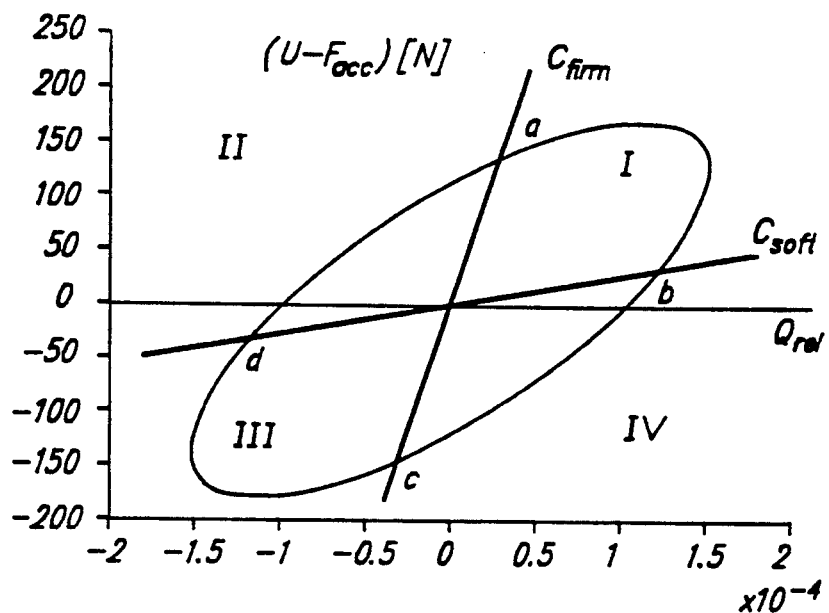
Piston Force $(U-F_{occ})$ Vs. Relative Flow $Q_{rel}$ $[m^3/s]$ At 2Hz Heave Road Input
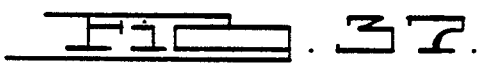
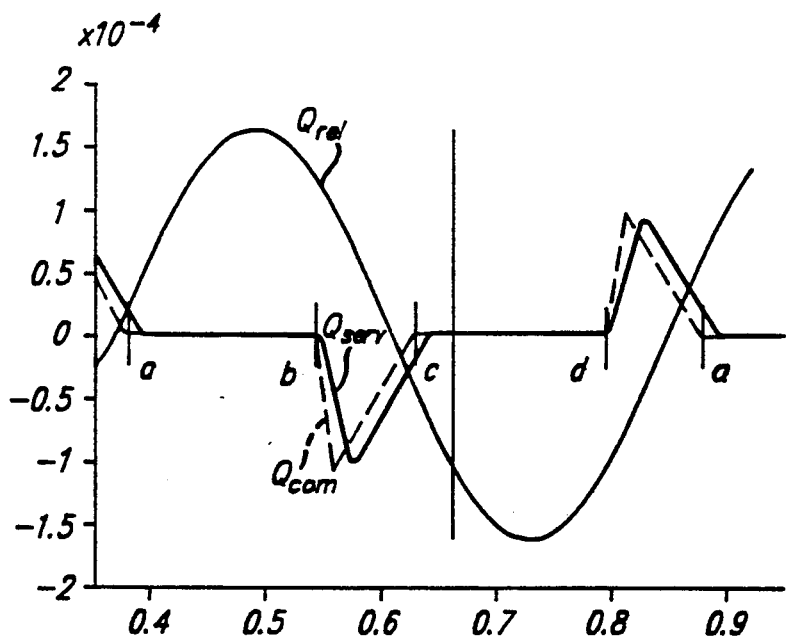
The Flow From The Servo Valve $Q_{serv}$ At 2Hz Heave Road Input. Positive Flow Is Into the Actuator.
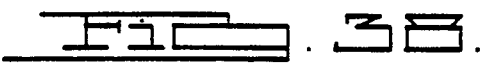

Piston Force Vs. Relative Flow For Heave Road Input At Frequencies: A: 1 Hz, B: 3 Hz, C: 9 Hz

METHOD AND APPARATUS FOR DYNAMIC LEVELING OF A VEHICLE USING AN ACTIVE SUSPENSION SYSTEM

This is a continuation of U.S. patent application Ser. No. 07/535,362, filed Jun. 8, 1990 now U.S. Pat. No. 5,097,419.

BACKGROUND OF THE INVENTION

This invention relates to vehicle suspension systems, and more particularly to a method and apparatus for a low power active suspension system for dynamic leveling of a motor vehicle.

In recent years, substantial interest has grown in motor vehicle suspension systems which can offer improved comfort and road holding over the performance offered by conventional passive suspension systems. In general, such improvements are achieved by utilization of an "intelligent" suspension system capable of electronically controlling the suspension forces generated by hydraulic actuators provided at each corner of the motor vehicle.

Suspension systems are provided to filter or "isolate" the vehicle body from vertical road surface irregularities as well as to control body and wheel motion. In addition, it is desirable that the suspension system maintain an average vehicle attitude to promote improved platform stability during maneuvering. The classic passive suspension system includes a spring and a damping device in parallel which are located between the sprung mass (vehicle body) and the unsprung mass (wheel and axles).

Hydraulic actuators, such as shock absorbers and/or struts are used in conjunction with conventional passive suspension systems to absorb unwanted vibration which occurs during driving. To absorb this unwanted vibration, the hydraulic actuators are automobile. A piston is located within the actuator and is connected to the body of the automobile through a piston rod. Because the piston is able to limit the flow of damping fluid within the working chamber of the actuator when the actuator is telescopically displaced, the actuator is able to produce a damping force which counteracts the vibration which would otherwise be directly transmitted from the suspension to the vehicle body. The greater the degree to which the flow of damping fluid within the working chamber is restricted by the piston, the greater the damping forces which are generated by the actuator.

In selecting the amount of damping that an actuator is to provide, three vehicle performance characteristics are often considered: ride comfort, vehicle handling and road holding ability. Ride comfort is often a function of the spring constant of the main suspension springs of the vehicle, as well as the spring constant of the seat, tires, and the actuator. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

To optimize ride comfort, vehicle handling, and road holding ability, it is generally desirable to have the damping forces generated by the actuator be responsive to the input frequency from the road. When the input frequency from the road is approximately equal to the natural frequency of the body of the automobile (e.g., approximately between 0–2 Hz), it is generally desirable to have the actuator provide large damping forces to avoid excessively rapid variation of the vehicle's attitude during cornering, acceleration and deceleration. When the input frequency from the road is between 2–10 Hz, it is generally desirable to have the actuator provide low damping forces so as to produce a smooth ride and allow the wheels to follow changes in road elevation. When the input frequency from the road is approximately equal to the natural frequency of the automobile suspension (i.e., approximately 10–15 Hz), it may be desirable to have relatively low damping forces to provide a smooth ride, while providing sufficiently high damping forces so as to prevent excessive loss of contact between the wheels and the ground.

To obtain the desired damping characteristics over a wide range of driving conditions, efforts have been made toward the development of continuously variable damper valving. Such variable damper valving is able to adjust or vary the damping characteristics of a hydraulic actuator in response to rapid variations which occur during cornering, acceleration, and deceleration.

Recent advancements in sensor and microprocessor technology have created substantial interest in the application of "active" suspension systems in motor vehicles. An "active" suspension is defined as a suspension system with real time control of body and wheel motion. An actuator or force generator replaces or is added to the conventional passive suspension member. The dynamic behavior of a motor vehicle can be dramatically modified through application of an "active" suspension system.

Referring to FIG. 1, a diagrammatical illustration of a simplified control scheme for an active suspension is shown to include a closed loop control system 10 wherein the behavior of vehicle 12 is measured by multiple sensors 14 (i.e. accelerometers, gyroscope, potentiometers). A microprocessor-based controller 16 processes the sensed signals and calculates a demanded suspension force "U" for each actuator 18. Actuators 18 are provided at each corner of the vehicle and are independently controlled. Vehicular Inputs 20, which effect the dynamic behavior of vehicle 12, include disturbances such as road undulations, inertia forces generated during cornering and breaking, and aerodynamic forces. The active suspension is designed to compensate for these disturbances while providing improved ride isolation, improved road handling, reduced pitch and roll angles, control of lateral load transfer between front and rear axles, and control of the vehicle ride height above the road.

In general, active suspension systems are technically complex due to the demand for fast response and accuracy from the hydraulic system, the actuators and the control system. Heretobefore, application of active suspension systems in motor vehicles has been limited due to the excessive cost associated with the complex hardware and controls.

The demanded force signal "U" can be described as a function of state variables describing the vertical motion of vehicle 12 and of the road conditions. FIG. 2 illustrates a simplified ¼ model of vehicle 12 having two degrees of freedom (DOF) which is described by four state space variables. The state variables include body displacement ($X_b$), body velocity ($\dot{X}_b$), wheel displacement ($X_w$) and velocity ($\dot{X}_w$). Inputs from road 22 are identified as ($X_{road}$). An active suspension actuator 18 is diagrammatically illustrated as suspended between body 24 and wheel 26 relative to road 22 and in parallel with a passive suspension member 28. Control law for the calculation of the demanded force "U" for the single active actuator 26 shown is:

$$U = -G \cdot X \tag{1}$$

where:

$$U = g_1(\dot{X}_b) + g_2(X_b) + g_3(\dot{X}_w) + g_4(X_w) + g_5(X_{road}) \tag{2}$$

Gains $g_1$ and $g_3$ represent inertial damping and $g_2$ and $g_4$ reflect inertial stiffness for the body and wheel, respectively. Feedback of the road $g_5$ is provided to tie wheel 26 to the road 22. Various techniques are known for defining a feedback gain matrix (i.e., Linear Quadratic Gaussian) to best fulfill specific design objectives associated with dynamically controlling the behavior of vehicle 12.

In general, active suspension systems can be divided into three basic classes; "semi-active", "low power" active, and "fully" active. A primary difference between each of the aforementioned active suspension classes relates to the hardware requirements to be hereinafter described. In general, "low power" active and "fully" active suspension systems each use a central hydraulic system to power each suspension actuator. "Semi-active" systems, however, only have the ability to dissipate power by varying the damped resistance to motion.

Semi-active damping systems are based on continuous, real time modulation of damping rates, separately in compression and extension. Semi-active control strategy is based on the principle that a suspension actuator is only capable of dissipating power. Referring to FIGS. 3 and 4, an actuator 32 for a semi-active suspension system is illustrated. In practical terms, semi-active actuator 32 is equipped with infinitely variable camper valving 34. A self-contained source of damping fluid is confined within working chambers 36 and 38 provided on opposite sides of piston 40. Compared to a conventional passive damper, semi-active actuator 32 can dissipate power to provide a demanded force "U". However, the control strategy for semi-active suspension systems must be simplified from that of equation (2) to include only velocity of the vehicle body ($\dot{X}_b$) and the relative suspension velocity ($\dot{X}_w - \dot{X}_b$).

For power dissipation:

$$U = g_1(\dot{X}_b) + g_2(\dot{X}_w - \dot{X}_b) \quad \text{(Quandrants I and III)} \tag{3}$$

For power demand:

$$U = O \quad \text{(Quadrants II and IV)} \tag{4}$$

In "ideal" semi-active systems, the demanded force "U" is set to zero (U=O) if the relative velocity ($\dot{X}_w - \dot{X}_b$) is of the opposite sign and/or the demanded force "U" is out of "reach" for actuator 32. These conditions are reflected as Quadrants II and IV of the Force "U" versus relative velocity ($\dot{X}_w - \dot{X}_b$) graph of FIG. 4. Therefore, as is readily apparent, semi-active systems are capable of dissipating power (Quadrant I and III) but are not capable of generating all demanded force requirements (i.e. Quadrant II and IV) associated with dynamically controlling vehicle behavior.

Modernly, "low power" active systems have heretobefore been used almost exclusively on race cars. Unfortunately, the frequency response of low power active systems is restricted to a undesirably narrow frequency range (0–5 $H_z$) as well as a significantly lower power output than required for "fully" active systems. FIG. 5 schematically illustrates a single-acting hydropneumatic actuator 42 applicable for low power active suspension systems. Because of the low frequency response of actuator 42, the control strategy of Equation (2) is limited to a narrower frequency range which necessitates exclusion of high frequency control of the wheel. Therefore the control equation is defined as:

$$U = g_1(\dot{X}_b) + g_2(X_b) \tag{5}$$

Low power systems have a central pump 50 supplying high pressure to each corner actuator 42. Hydropneumatic actuator 42 communicates with an accumulator 44 through a fixed flow damper valve 46 for damping the suspension motion. A servo valve 48 is either supplying actuator 42 with high pressure fluid provided from a central pump 50 or emptying actuator 42 of fluid which is then returned to a central reservoir 52. The suspension stiffness is supplied by a passive spring member (not shown) and the pressure in accumulator 44. In low power active systems, hydraulic damping fluid is selectively controlled to flow between central reservoir 52 and actuator 42 in response to changes in the vehicle's attitude.

"Fully" active suspension systems are designed to control both wheel and body motion over the entire frequency range (approximately 0–30 $H_z$). A "fully" active suspension actuator 60 is schematically illustrated in FIG. 6. Specifically, the central hydraulic system (i.e., pump 50 and reservoir tank 52) is basically the same as the one used for the low power active but designed to provide higher flow rates for increased peak power consumption. Actuator 60 is basically a double-acting hydraulic device having an upper working chamber 62 and a lower working chamber 64 defined by opposite sides of piston 66. A four port servo valve 68 connects each working chamber 62 and 64 to the high supply pressure source (pump 50) or back to central reservoir 52. The controlling formula, that is, equation (2) can be used to its full merits to include control to both vehicle body and wheel motion.

However, the current costs associated with "fully" active suspension systems are extremely high, primarily because of the fast frequency response requirements of servo valve 68 and the high peak flow rates associated with the central hydraulic system. Actuator 60 is not equipped with damper valving through piston 66 whereby system power requirements are extremely high to generate movement of the piston and rod directly from the pressure difference generated across piston 66. Therefore, high system pressure requirements, large peak power and peak fluid flow requirements are associated with conventional "fully" active suspension systems. Furthermore, the duty cycle of such a "fully" active suspension system is almost continuous due to constant modulated actuation of servo valve 68 to control fluid flow to and from actuator 60. Accordingly, there is a need to reduce the complexity, size of the components, system cost, peak system working pressure, and peak power requirements, while effectively generating superior operational durability characteristics.

It is to be understood that the terms "height", "distance", "attitude", and derivatives thereof are used interchangeable herein as well as throughout the automotive art, as referring to the magnitude of spacing between a vehicle's sprung and unsprung portions (e.g., between a vehicle frame and its associated axles or independent wheels).

SUMMARY OF THE INVENTION

Accordingly, it is a primary object of the present invention to provide a method and apparatus for dynamic leveling of a motor vehicle which overcomes the disadvantages of the various active suspension systems herebefore described, and which is fully active yet has relatively low power consumption and low peak flow requirements.

Another object of the present invention is to provide a method and apparatus for dynamic leveling which is operable to change the attitude of a vehicle through a controlled adjustment of the suspension damping force so as to compensate for vehicle body height variation.

Another object of the present invention is to provide a method and apparatus for dynamic leveling which generates improved reaction time while reducing system working pressure parameters and peak power and flow requirements.

A further object of the present invention to provide a method and apparatus in which a continuously variable flow restriction is used to dissipate power for limiting the duty cycle of the dynamic leveling suspension system.

Yet another object of the present invention is to provide a method and apparatus for dynamic leveling which independently adjusts the vehicle height for each corner by selectively controlling the fluid pressure and flow between the upper and lower portions of a working chamber of the hydraulic actuator.

A further object of the present invention is to provide an improved active suspension control scheme. The control scheme includes a "dynamic leveling" loop and a "load leveling" loop. The "dynamic leveling" loop is divided into signal processing and vehicle controller circuits. Outputs from the vehicle's sensors are received by the signal processing circuit for estimating the state variables which are not measured directly. The estimated state variables are delivered to the full state feedback vehicle controller for multiplication with the feedback gain matrix to generate a demanded force signal for each of the actuators.

It is a further object of the present invention to accurately define the dynamic behavior characteristics of the vehicle and suspension by applying a method of estimating the state variables which are not measured directly. As such, the sensor configuration associated with the present invention is commercially feasible and relatively inexpensive.

It is another object of the present invention to provide a frequency dependent adaptive gain circuit for automatically tuning the vehicle controller circuit. Adaptive gain regulation is a continual process of identifying and modifying the feedback gain matrix of the vehicle controller for actively suspending the vehicle at relatively low frequency road inputs and passively at wheel hop frequencies. The adaptive circuit is simple in structure for convenient implementation to the full feedback regulation of the active control scheme.

It is yet a further object of the present invention to provide an actuator control strategy for driving each of the corner actuators of the low power dynamic leveling suspension system of the present invention.

It is another object of the present invention to provide a method and apparatus for dynamic level which has a high degree of flexibility with respect to installation on different vehicle models. In this regard, a related object of the present invention is to provide a method and apparatus for dynamic leveling which is relatively low in cost as compared to other active suspension systems known in the art.

BRIEF DESCRIPTION OF THE DRAWINGS

Various advantages of the present invention will become apparent to one skilled in the art upon reading the following specification and by reference to the following drawings in which:

FIG. 1 diagrammatically illustrates a simplified control system for active suspension systems;

FIG. 2 is a schematic representation of a ¼ vehicle model for an active suspension system and the control law associated therewith;

FIG. 3 is a schematic representation of an actuator for a "semi-active" suspension system;

FIG. 4 is a graphical illustration of the range of the demanded suspension forces "U" which can be generated by the semi-active actuator of FIG. 3;

FIG. 8 is a schematic representation of a single dynamic leveling actuator and its associated hydraulic system components according to a first embodiment of the present invention;

FIGS. 9 through 13 are schematic representations of dynamic leveling systems according to alternative embodiments of the present invention;

FIG. 17 illustrates a representative gain matrix "G" for the "dynamic leveling" control loop;

FIG. 18 is a plot of the pole placement in the S-plane for exemplary body and wheel damping performance goals;

FIG. 20 is a block diagram illustrating a derivating circuit for estimating suspension velocity;

FIG. 23 is a block diagram of the circuit for estimating roll rate and angle from roll acceleration;

FIG. 32 is a graphical illustration of demanded force "U" versus relative flow $Q_{rel}$;

FIG. 33 is another plot of demanded force "U" versus the relative flow $Q_{rel}$;

FIG. 37 is a plot of piston force versus relative flow;

FIG. 38 illustrated an exemplary duty cycle for selective actuation of the servo valve;

DESCRIPTION OF THE PREFERRED EMBODIMENT

Figure 5:
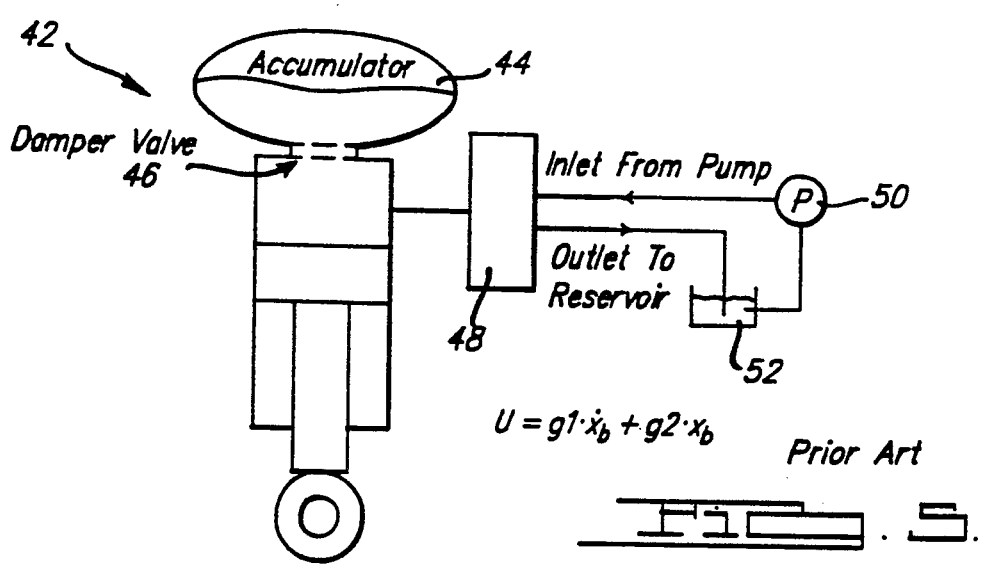
FIG. 5 is a schematic representation of a "low power" active suspension actuator and hydraulic system.
Figure 6:
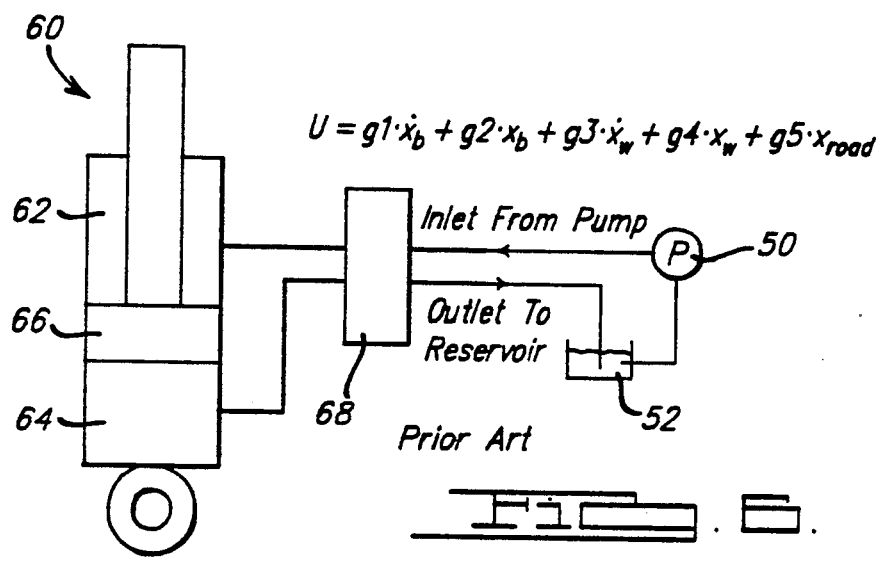
FIG. 6 is a schematic illustration of a "fully" active suspension actuator and hydraulic system.

The excessively high power consumption and peak flow requirements associated with the "fully" active suspension system described in reference to FIG. 6 predicated the development of a lower power "fully" active suspension system adapted for application over the entire frequency range (0-30 Hz). The present invention relates to such a "dynamic or fast leveling" suspension system. In particular, the present invention is a dynamic leveling system which includes an actuator provided at each corner of the vehicle having continuously variable damping regulation and static load leveling capability. The improved active suspension system of the present invention is constructed as a "fully" active suspension which only requires the addition of external energy to compensate for vehicle body motion. By leaving the wheels passively controlled, the required frequency of external energy to compensate for vehicle body motion. By leaving the wheels passively controlled, the required frequency response of the system hardware is substantially reduced. The system actuators, to be hereinafter described in greater detail, are a combination of a continuously variable damper and a fast acting hydraulic leveling actuator.

System Hardware

Figure 7B:
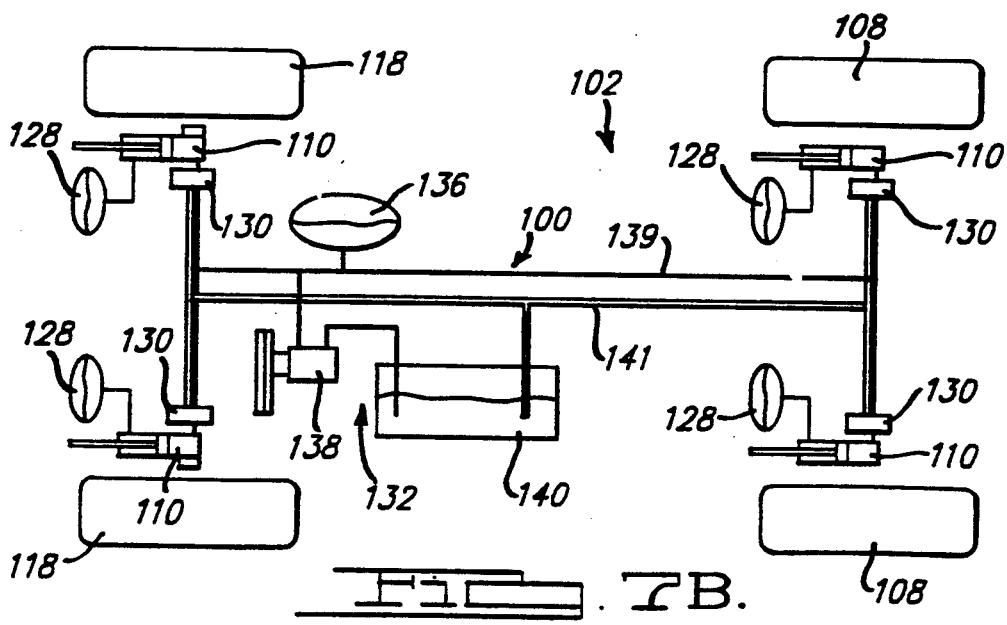
FIG. 7B is a schematic representation of the dynamic leveling and hydraulic systems of the present invention.
Figure 7A:
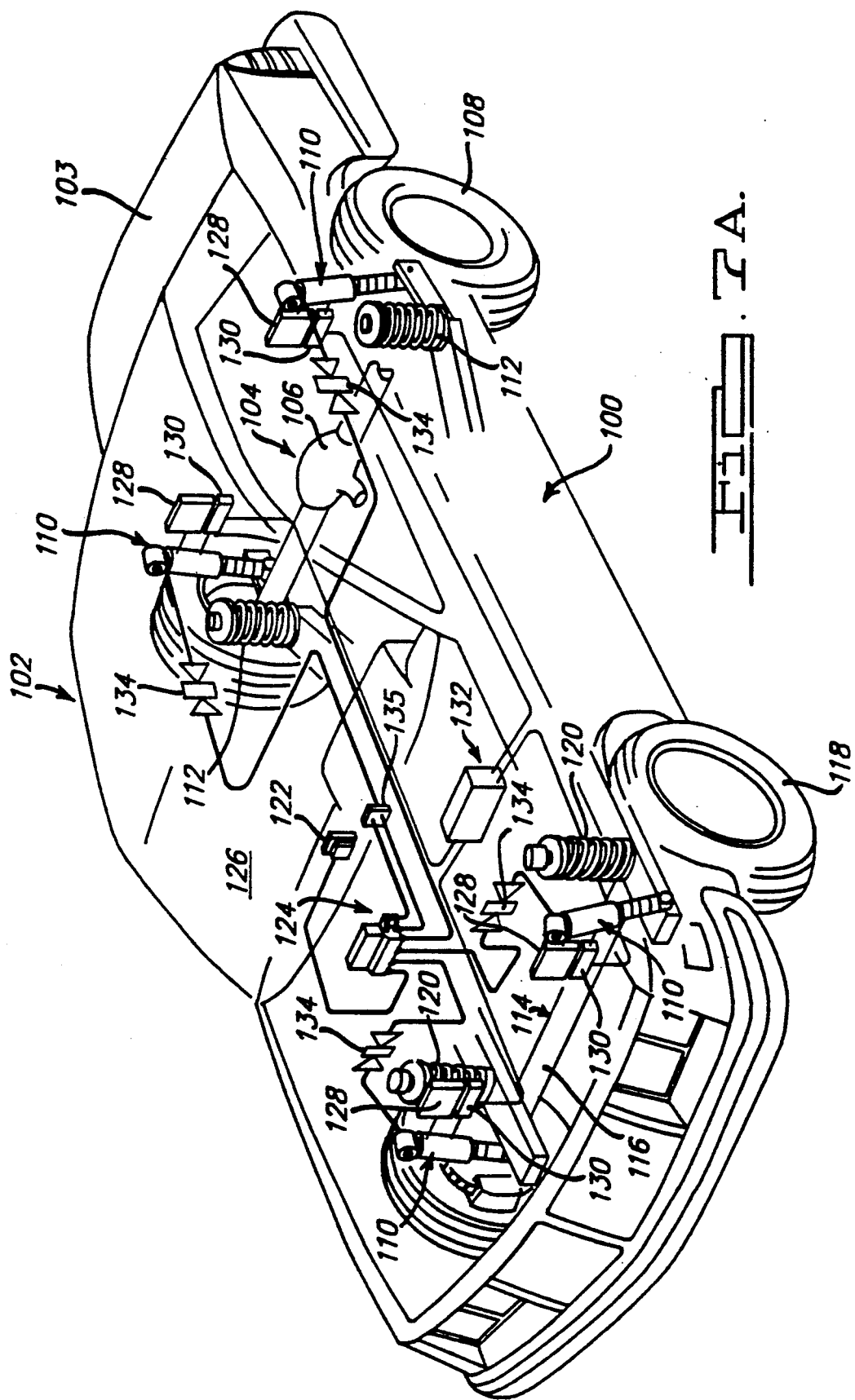
FIG. 7A illustrates a dynamic leveling suspension system according to the teachings of the present invention shown in operative association with a typical motor vehicle.

Referring to FIGS. 7A and 7B, a dynamic leveling system 100 in accordance with the present invention is shown. The dynamic leveling system 100 is depicted in operative association with a conventional automobile 102 having vehicle body 103. Automobile 102 includes a rear suspension 104 having a transversely extending rear axle assembly 106 adapted to support rear wheels 108. Rear axle assembly 106 is operably connected to automobile 102 by means of a pair of hydraulic actuators 110 as well as by helical coil springs 112. Similarly, automobile 102 has a front suspension system 114 including a transversely extending front axle assembly 116 adapted to support front wheels 118. Front axle assembly 116 is connected to automobile 102 by means of a second pair of hydraulic actuators 110 and by a second pair of helical coil springs 120. While automobile 102 has been depicted as a passenger car, the dynamic leveling system 100 may be used with other types of motor vehicles as well. Furthermore, the structural association of the front and rear axle assemblies are exemplary in nature and are not intended to limit the scope of the present invention.

For controlling the damping and leveling characteristics of hydraulic actuators 110, a central electronic control module (ECM) 124 is provided. A visual screen 122 may be located within passenger compartment 126 of automobile 102. Visual screen 122 provides the occupant with a visual readout display of the dynamic control parameters and characteristics of suspension system 100. Electronic control module 124 receives output from various sensors for generating control signals for selectively controlling the damping (dissipative) and dynamic leveling (power addition) characteristics of hydraulic actuators 110. In fluid communication with each actuator 110 is an accumulator 128 and a supply valve such as servo flow control valve 130. Servo valves 130 are in fluid communication with a closed-loop centralized high pressure hydraulic system 132, (schematically shown in FIG. 7A), which includes a pump 138, central accumulator 136, and reservoir tank 140.

The electronics associated with dynamic leveling system 100 preferably include a central control module (not shown) interfaced with ECM 124, position sensors 134, accelerometer 135, and driving circuitry for controlling actuators 110 and servo values 130. The closed-loop hydraulic system 132 includes central pump 138 and accumulator 136 for generating a high supply pressure to each actuator 110, reservoir tank 140, and the various high pressure supply lines 139 and low pressure return lines 141 interconnecting the components. The supply of high supply pressure fluid to each actuator 110 is controlled by energization of its respective servo valve 130 which, preferably, is located in close proximity thereto. While supply valve 130 is illustrated as a servo valve, it is to be understood that other suitable direct acting valves are within the fair scope of the present invention.

As will be detailed hereinafter, dynamic leveling system 100 employs a central control strategy having a state space variable format for full feedback gain regulation, state variable estimating means and adaptive gain control. In general, the feedback gain regulation is specified by performance goals defining stiffness and damping for different modes of dynamic motion. To minimize the number of transducers required, the variable estimating means calculates estimated values from the transducer signals actually measured. The adaptive scheme changes some of the damping gains values when road conditions interfere with the natural frequency of the wheel. Furthermore, by sensing the dynamic behavior of the body and suspension, the microprocessor-based controller calculates the demanded force "U" for each actuator. In order to compensate for non-linearities of the actuator hardware, the actual force generated by each actuator "$F_{actuator}$" is measured and fed back to the central control system. Preferably, actuator 110 is capable of dissipating power through use of continuously variable piston valving to limit the demanded power requirements associated with actuation of servo valves 130. Therefore, by using the internal continuously variable piston valve for all dissipated power demands, the total power consumption and, therefore, the duty cycle of system 100 is substantially minimized.

With particular reference to FIG. 8, a schematic representation of dynamic leveling system 100 according to a first embodiment is shown. While only one actuator 110 is illustrated, it is to be understood that an actuator and its corresponding accumulator 128 and servo valve 130 are located at each corner of vehicle 102. Hydro-pneumatic actuator 110 is a single-acting device comprising an elongated tubular pressure cylinder 144 having a working chamber 146 which is adapted to store hydraulic damping fluid. Disposed within working chamber 146 is a reciprocable piston 148 that is secured to one end of an axially extending piston rod 150 so as to define an upper portion 152 and a lower portion 154 of working chamber 146. As illustrated in reference to FIG. 7, actuators 110 are connected between the sprung and unsprung masses of vehicle 102. Those skilled in the art will appreciate that, upon reciprocal movement of piston 148, damping fluid within pressure cylinder 144 is transferred between upper portion 152 and lower portion 154 of working chamber 146 through piston damper valving. By selectively controlling the flow of damping fluid between upper and lower portions of working chamber 146, hydro-pneumatic actuators 110 are able to controllably dampen relative movement between the sprung and unsprung portions of automobile 102 so as to optimize both ride comfort and road handling ability.

To provide means for controlling the flow of damping fluid between upper portion 152 and lower portion 154 of working chamber 146, piston 148 includes continuously variable flow restriction valving 156. The variable flow restriction piston valve 156 is actuated to selectively meter the flow of damping fluid between upper portion 152 and lower portion 154 for modulating the damping characteristic of actuator 110 through the dissipation of energy. One such continuously variable flow restriction valve and its corresponding electronic control system and hardware is disclosed in PCT International Publication, Ser. No. WO 88/06983, filed Sep. 22, 1988 having a common assignee with the instant application and which is explicitly incorporated by reference hereto. It is contemplated, however, that the present invention may be used with other suitable variable flow restricting valving arrangements adapted for selectively controlling the damping characteristic of actuator 110.

To provide means for changing the fluid pressure in at least one portion of working chamber 146, flow control means is provided. The flow control means comprise electrohydraulic proportional/servo flow control valves 130 which are illustrated as being fluidly connected to lower portion 154 of working chamber 146. In general, servo valve 130 is either supplying actuator 110 with high pressure fluid or emptying actuator 110 of fluid which is then returned to reservoir 140. The actual force $F_{actuator}$ generated by each actuator 110 is dependent on the pressure in accumulator 128 and the pressure drop across piston 148. More specifically, servo flow control valve 130 is actuated to selectively control the flow between direct acting pump 138 and lower portion 154 of working chamber 146. Likewise, servo flow control valve 130 is also able to control the flow of damping fluid from lower portion 154 of the working chamber 146 to fluid reservoir 140. Preferably, an actuator controller circuit to be described hereinafter, controls the selective actuation of piston valving 156 and servo valve 130.

According to the first embodiment shown, accumulator 128 is connected to upper portion 152 of working chamber 146 so as to maintain a pressure differential in upper portion 152 across piston 148 during actuation of servo flow control valve 130. Because piston 148 includes variable flow restriction valving 156 in conjunction with servo flow control means 130, dynamic leveling system 100 is able to operate with relatively low use of pump 138 when compared to the conventional fully active suspension systems of FIG. 6. This is accomplished since variable flow restriction valving 156 is used for generating the commanded force "U" when it is within the flow limits of valve 156 thereby minimizing the power requirements of central hydraulic system 136.

Referring now to FIG. 9 through 13, alternative structural configurations of the present invention are disclosed. In general, each embodiment is adapted to provide a continuously variable flow restriction between servo flow control valve 130 and accumulator 128. More preferably, the embodiments illustrate use of variable flow restriction valve 156 within cylinder 144. For the sake of clarity, like reference numerals are used hereinafter for like components.

With specific reference now to FIG. 9, a dynamic leveling system 100(B) is similar to dynamic leveling system 100 shown in FIG. 8. However, damping fluid is able to flow between central hydraulic system 136 and lower portion 154 of working chamber 146 through an axial passage 160 extending through piston rod 148.

The dynamic leveling system 100(C) shown in FIG. 10 is similar to dynamic leveling system 100 of FIG. 8, with the exception that damping fluid is able to flow between upper portion 152 of working chamber 146 and accumulator 128 through axial passage 162 extending through piston rod 148. Flow passage 162 extends from the upper portion of hollow piston rod 148 to upper portion 152 of working chamber 146. Preferably, accumulator 128 can be mounted directly to an axial end of piston rod 148 or in close proximity thereto.

The dynamic leveling system 100(D) shown in FIG. 11 is similar to dynamic leveling system 100 shown in FIG. 8 except that the orientation of piston rod 150 with respect to piston 148 has been inverted so that piston rod 150 extends from a lower portion of tubular cylinder housing 144.

The dynamic leveling system 100(E) shown in FIG. 12 is similar to dynamic leveling system 100(D) shown in FIG. 11 with the exception that accumulator 128 is disposed on, and in direct fluid communication with, an upper axial end of hydraulic actuator 110. This embodiment represents the application of an actuator having an accumulator secured as an integral extension thereof. In this manner, high pressure lines can be readily eliminated.

The dynamic leveling system 100(F) shown in FIG. 13 is similar to the dynamic leveling system 100(E) shown in FIG. 12. However, accumulator 128 is disposed within upper portion 152 of working chamber 146 inside of tubular housing 144.

The various alternative embodiments disclosed illustrate the flexibility and applicability of the present invention to modern automotive suspension rattle space and layout requirements. Furthermore, it is to be understood that accumulator 128 can be remotely located from actuator 110 for packaging reason, but preferably, is provided in close proximity to actuators 110. Similarly, it is preferable that each servo valve 130, or suitable supply valve, be located as near as practical to its corresponding actuators 110. The closed loop central hydraulic system 132 illustrates that pump 138, central accumulator 136 and reservoir 140 are fluidly connected to each servo valve 130.

Figure 14:
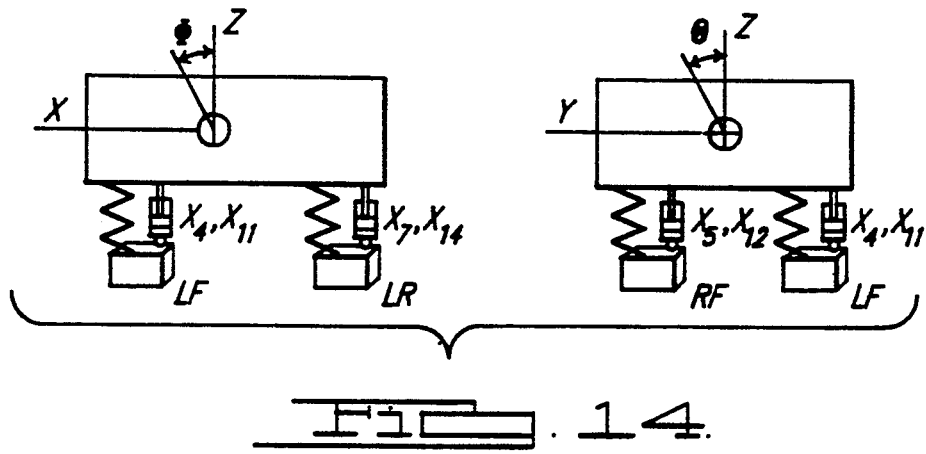
FIG. 14 is a schematic of a simplified vehicle model with the state variables for identifying the dynamic behavior of a vehicle.

Preferably, all of the dynamic leveling systems of the present invention include a sensor configuration which is practical in light of present technology. More preferably, the sensor configuration is adapted to directly measure heave, pitch, and roll acceleration of the vehicle body as well as the relative displacement between the wheel and the vehicle body at each corner of the vehicle. The dynamic movement of a motor vehicle can be adequately described by a seven degree of freedom (DOF) model which defines the heave, pitch and roll motion of the vehicle body and the vertical motion for each of the four wheels. More particularly, the vehicle's dynamic behavior is described by fourteen (14) state variables associated with the model. location of the poles is given by the performance requirements of the vehicle. FIG. 14 is a simplified vehicle model illustrating the fourteen (14) state variables associated with identifying the dynamic behavior of vehicle 102.

The first seven state variables are velocities and the final seven state variables are displacements:

| VELOCITY | DISPLACEMENT |
| --- | --- |
| $x_1 = \dot{Z}$, heave velocity of C.G. | $x_8 = Z$, heave displacement |
| $x_2 = \dot{\theta}$, Pitch angular velocity | $x_9 = \theta$, Pitch angle |
| $x_3 = \dot{\Phi}$, Roll angular velocity | $x_{10} = \Phi$, Roll angle |
| $x_4 = $ Left Front suspension vel. | $x_{11} = $ LF suspension displ. |
| $x_5 = $ Right Front suspension vel. | $x_{12} = $ RF suspension displ. |
| $x_6 = $ Right Rear suspension vel. | $x_{13} = $ RR suspension displ. |
| $x_7 = $ Left Rear suspension vel. | $x_{14} = $ LR suspension displ. |

In reference again to FIG. 7, relative position sensors 134 are located between the unsprung and sprung masses for measuring the relative displacement at each corner. A tri-axial accelerometer 135, located in the close proximity to the vehicle's center of gravity, directly measures heave, pitch and roll acceleration. However, it is contemplated that individual accelerometers can be used which are located at each corner of the vehicle.

In addition to the input sensors, a force transducer (not shown) is provided at each corner to measure the actual output force "$F_{actuator}$" generated by each actuator which is fed back to the actuator controller to verify that $F_{actuator}$ is closely tracking the commanded force "U". However, it is contemplated that the force transducers can be readily substituted with absolute pressure sensors for measuring the actuator pressure across the variable damping restriction. The force transducer or the pressure sensors are preferably located within damper valve 156 as disclosed in the PCT application herebefore incorporated by reference. As will be described hereinafter in greater detail, the signals from sensors 134 and 135 are amplified and fed into the D/A convertor of a microprocessor. Exemplary non-limiting sampling times for the relative displacement and the accelerations are approximately in the range of about 100 to 500 Hz and the sampling time for the force transducers is in the range of about 1,000 to 2,000 Hz.

System Control Structure

Figure 15:
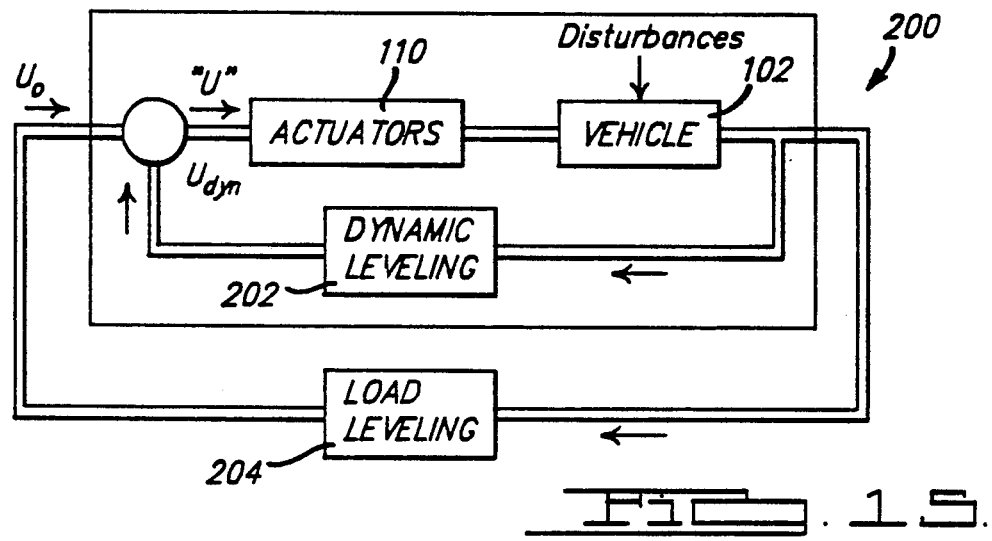
FIG. 15 is a block diagram of a vehicle control system in accordance with the teaching of the present invention.

Referring to FIG. 15, a simplified vehicle control system 200 is illustrated for the present invention. Preferably, the control system 200 is interfaced with the electronic control module 124 of vehicle 102. In general, control system 200 includes an inner closed loop 202 and an outer closed loop 204, each closing around vehicle 102. Outer loop 204 is referred to as the "loading leveling" control circuit which compensates only for the vehicle's ride height relative to a vertical plane upon different static loading conditions. Inner loop 202, referred to as the "dynamic leveling" control circuit provides improvements in the isolation of the vehicle from the road, body platform stability, and in the maintenance of improved road holding capability. Preferably, control system 200, which will be described hereinafter in greater detail, is structured as a full state feedback regulation system with feedback gain values representative of specified vehicle performance criteria.

Each of the four corner actuators 110 is commanded by control system 200 to generate the four distinct suspension forces "U". Preferably, sensors, schematically identified herein as numeral 206 in FIG. 16, directly measure the seven(7) sensed signals. Sensors 206 also represents the corresponding amplification and filtering required for sampling of the measured signals by the microprocessor. Outer loop 204 is adapted so as not to affect inner loop 202 since the time delay of "load leveling" outer loop 204 is extremely large when vehicle 102 is in operation. However, when vehicle 102 is stopped, quicker response time is contemplated for vehicle attitude height compensation through the "load leveling" circuit.

Figure 16:
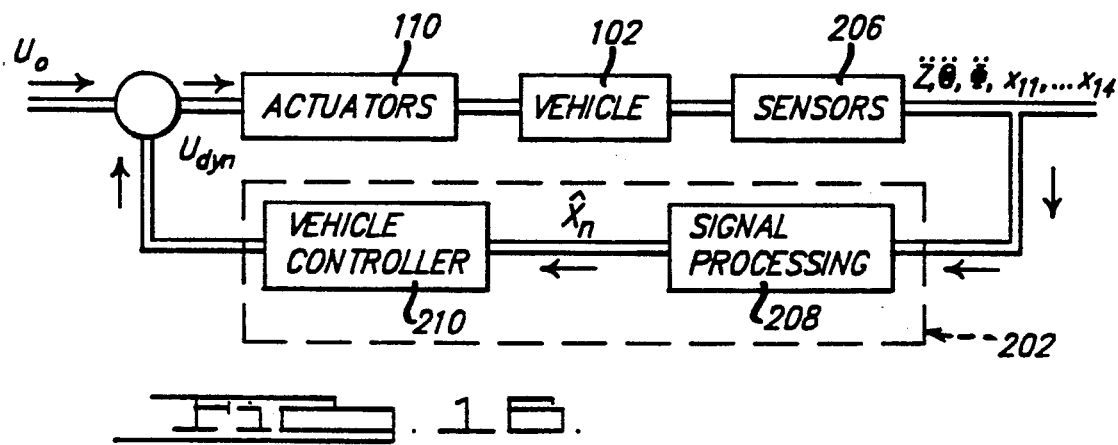
FIG. 16 is a block diagram illustrating the signal processing and vehicle controller circuits of the "dynamic leveling" control loop of FIG. 15.

FIG. 16 is a diagrammatical illustration of inner loop 202 which includes signal processor 208 and vehicle controller 210. Signal processor 208 estimates the remaining state variables based on input of the directly measured sensor signals. Vehicle controller 210 includes a feedback gain regulation format for using the feedback gain for each state variable to calculate the desired dynamic behavior. The output $U_{dyn}$ is a vector of a component of the four demanded "U" forces for the actuators 110.

In particular, heave acceleration ($\ddot{Z}$), pitch acceleration ($\ddot{\theta}$) and roll acceleration ($\ddot{\Phi}$) are directly measured by tri-axial accelerometer 135 and suspension displacement $x_{11}$ through $x_{14}$ are measured directly by the position sensors 134. From these seven (7) actual measurements, signal processor 208 estimates ten (10) state variables. As is apparent, the dynamic behavior of vehicle 102 is described through a seven degree of freedom (DOF) model with the state space variable selected such that feedback gains can be defined as additional stiffness and damping acting on the vehicle.

The differential equations for the "dynamic leveling" control system are written in the following standard form:

$$\dot{x} = A \cdot X + B_1 \cdot U_{dyn} + B_2 \cdot E \qquad (6)$$

where:
- X is the vector of the 14 state variables
- $U_{dyn}$ is the vector of the four control forces
- E is the vector of m disturbances
- A is the 14×14 vehicle system matrix
- $B_1$ is the feed back input matrix 14×4
- $B_2$ is the disturbance matrix 14×m The outputs are defined as:

$$y = C \cdot X \quad (7)$$

where:
- Y is the vector of n outputs
- C is the n×14 output matrix

The "commanded" force for each actuator is:

$$U_{dyn} = -G \cdot X \quad (8)$$

where:
- $U_{dyn}$ is the vector of the four actuator forces
- X is the vector of the 14 state variables
- G is the 4×14 feedback gain matrix $U_{dyn}$ can be replaced by$(-G\ X)$ in equation (6). Therefore, the closed-loop control system equation can be rewritten to:

$$x = (A - B_1 \cdot G) \cdot X + B_2 \cdot E \quad (9)$$

The poles of the closed loop are determined by the eigenvalues of the matrix $A_{active} = (A - B_1 \cdot G)$. The purpose is to assign magnitudes to the feedback matrix so that all poles assume prescribed values.

Vehicle Performance Goals

The feedback gain values of the "dynamic leveling" control scheme 202 are specified to give vehicle 102 a very stable platform and a good ride performance. Preferably, this is achieved through utilization of low rate passive support springs and the addition of active roll stiffness and body damping. Body damping is the damping of the three modes of motion; heave, pitch and roll. The body damping is set at a percentage of the critical damping for each mode for quickly stabilizing vehicle 102 after a road disturbance. Preferably, body damping is selected to be about 0.71 of the critical damping for each mode.

To meet various road conditions, wheel damping of the vehicle is selected for two distinct cases of vehicle performance, the first where the wheels are relatively softly damped and the second where the wheels are relatively firmly damped. The vehicle body should be damped to the same degree in both cases. For example, the soft wheel damping is set at 0.1 of the unsprung mass critical damping with the objective to give a smooth ride. The firm wheel damping is set at 0.5, with the objective to improve road holding and to minimize the relative displacement.

The vehicle 102 is designed to behave as a regular passive vehicle but with improved performance and body isolation. A non-limiting example of a set of predetermined vehicle performance requirements can be summarized in eight statements:

| | | |
|---|---|---|
| a: | Natural frequency in the front (passive) | 0.9 Hz |
| b: | Natural frequency in the rear (passive) | 1.0 Hz |
| c: | Heave and pitch uncoupled in C.G. | |
| d: | Roll stiffness at max. 0.8 g [m/s²] | 4°/g |
| e: | Front to rear roll stiffness ratio | 1.5 |
| f: | Unsprung mass damped for soft Ewheel | 0.1 |
| g: | Unsprung mass damped for firm Ewheel | 0.5 |
| h: | Damping for body modes of motions | 0.7 |

Feedback Gain Regulation

The feedback gains are specified by the vehicle performance in terms of stiffness and damping. "Active" stiffness is added to the vehicle body to satisfy the roll stiffness and to decouple the heave and pitch motion. "Active" damping, including body and wheel damping, is added to satisfy the requirement of damping the body (0.71) and the wheels (0.1 and 0.5) at the preferred predetermined percentage of their critical damping. Since wheel motion is coupled to the body, computing the eigenvalues for the closed loop matrix $A_{active}$ verifies the correct amount of damping.

Referring to FIG. 17, the format for a representative gain matrix "G" is shown as a 4 by 14 matrix wherein each row represents the gain values for one actuator. Column 1-7 represent the active "damping" and columns 8-14 the active "stiffness". Two distinct gain matrixes ($G_{soft}$ and $G_{firm}$) are developed to satisfy the desired performance requirements (a through h) and which includes gains corresponding to lower and upper limits of variable piston valve 156 in actuator 110.

FIG. 18 shows the location of the poles in the S-plane for the vehicle. The real axis represents the corresponding damping $Ew_o$ where E is the relative damping and $w_o$ the undamped natural frequency. The imaginary axis represent the damped natural frequency $w_n$ defined as $w_o\sqrt{1-E^2}$. A relative damping of 0.71 locates the poles along a line with the inclination of 45° to the negative real axis. A relative damping of 0.1 is represented by an 84° inclination and relative 0.5 is reflected as a 60° inclination. The active feedback control system locates the poles of the vehicle body along the 0.7 line and the poles for the wheels along the 0.1 and 0.5 lines.

An adaptive strategy, to be described hereinafter, continuously modifies the gain values of each matrix upon changes in road conditions.

Vehicle Pole Placement

The poles are the eigenvalues of the characteristic equation for the dynamic leveling system. The vehicle poles present information on the natural frequency and damping for each mode of motion. The pole placement of the closed loop system verifies whether the feedback gain matrix generates satisfactory results. The characteristic equation is derived by solving the determinant:

$$Det(sI - (A - B1 \cdot G)) = 0 \quad (10)$$

For a system with 14 state variables there are 14 eigenvalues that satisfy equation 910). When, as in this case, the system is underdamped, the eigenvalues are in pairs with a positive and a negative imaginary root.

Figure 19:
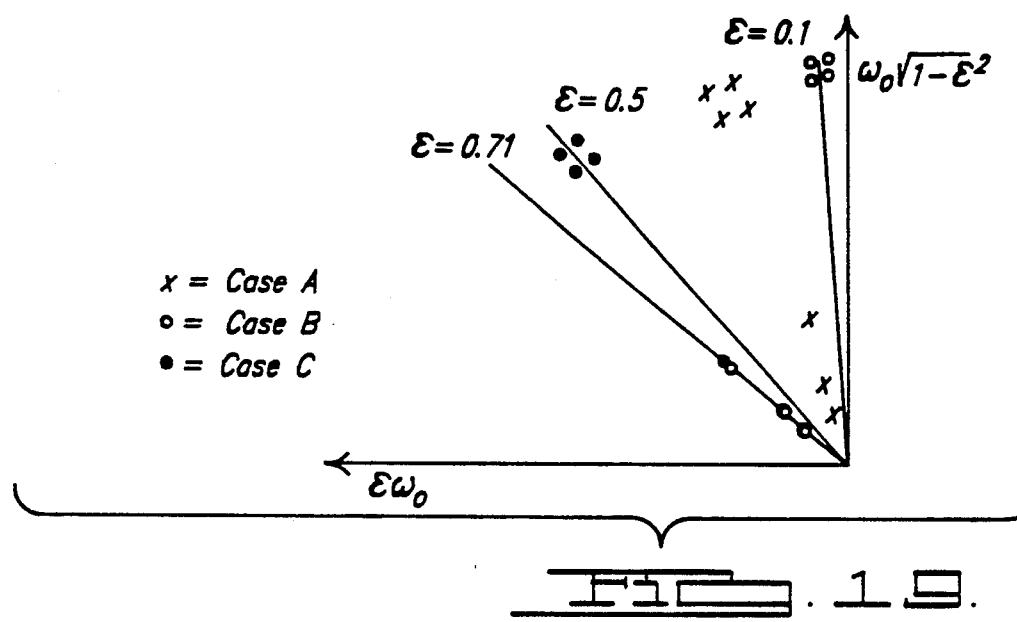
FIG. 19 is a plot of the pole placement for the feedback gain regulation system of the present invention.

The eigenvalues for three exemplary cases are shown in FIG. 19. The first case is based on a passive vehicle with the two remaining cases based on feedback gains $G_{soft}$ and $G_{firm}$. The passive vehicle would have a passive damper, giving the unsprung mass a relative damping of about $E_{wheel}=0.3$, and a roll bar representing the same roll stiffness as in both the active cases. The poles of the wheels are on the same radius from the origin for both active cases because of a difference in damping but not in stiffness.

The full state feedback regulation method of the present invention has a well-defined structure, which simplifies the understanding of control system 200. Since the gain varies are specified in terms of stiffness and damping, communication between the vehicle ride specialist and the controls engineer is made easier.

Estimation of State Variables

The "dynamic leveling" control loop 202 is divided into signal processing circuit 208 and vehicle controller 210. Analog signals from sensors 206 are filtered and sampled in signal processor 208. Observer 209 estimates the state variables and vehicle controller 210 multiplies the state variable vector $X_n$ with the gain matrix "G" to generate the "$U_{dyn}$" output signal.

In practical terms, the choice of sensor configuration is limited by the cost of each transducer and the quantity used. The goal is to describe all the state variables of the vehicle's motion with a sensor configuration which reliably uses a minimal number of relatively inexpensive transducers.

Efforts to directly measure all the state variables is extremely unrealistic. Therefore, signal processing of the sensed signals for estimating a number of the state variables is advantageous. Such a process is provided by "observer" 209. In the preferred microprocessor-based control system 200, signal processor 208 includes anti-aliasing filters and noise filtering. Anti-aliasing filters ensure that the highest frequency input seen by the A/D signal converter is at least about one-half the sampling frequency. The noise filtering eliminates undesirable information and can be either analog or digital.

As previously noted, the directly measured signals are heave $\ddot{z}$, pitch $\ddot{\theta}$ and roll $\ddot{q}$ body accelerations plus the relative displacements $x_{11}$ through $x_{14}$ for each suspension corner. The three modes of body acceleration can be measured simultaneously with tri-axial accelerometer 135 located at the center of gravity or, alternatively, with four accelerometers located at each corner of the vehicle body for measuring the vertical acceleration. Regardless, the accelerometer is capable of measuring acceleration at very low frequencies.

For position sensors 134, the vehicle's static height is defined as zero output, compression is defined as positive and extension is negative. The vehicle static height is maintained by the slower load leveling control loop 204. A preferred location of position sensor 134, from an environmental standpoint, would be inside actuator 110 itself. In addition to sensing the vehicle motion, it is also necessary to measure the force "$F_{actuator}$" generated by each actuator. Preferably, the actuator force is feedback to the actuator control circuit to compensate for nonlinearities of actuator 110 itself.

Given the preferred sensor configuration, observer 208 estimates ten state variables ($x_1$ to $x_{10}$). The method of estimation employs signal filtering techniques, which can be classified into three distinct categories:

I. Derivation of suspension relative displacement ($x_{11}$ through $x_{14}$) to suspension velocity ($\dot{x}_4$ through $\dot{x}_7$);

II. Integration of body accelerations ($\ddot{z}, \ddot{\theta}, \ddot{q}$) to body velocity and angular rates ($\dot{x}_1, \dot{x}_2, \dot{x}_3$); and III. Integration of body velocity and angular rates ($\dot{x}_1, \dot{x}_2, \dot{x}_3$) to body displacement and angles ($\hat{x}_8, \hat{x}_9, \hat{x}_{10}$).

The four suspension velocities ($\dot{x}_4$ through $\dot{x}_7$) are estimated by derivation of the suspension displacement ($x_{11}$ through $x_{14}$). Referring to FIG. 20, the derivation is performed by a first order high-pass filter 220 scaled to act as a "derivator" at relatively low frequencies. Filter 220 should neither show any major phase delay nor attenuation of the real velocity up to a frequency of at least about 25 Hz. Disturbances at higher frequencies are absorbed by the tire and the suspension bushings.

The analog to digital transfer function is:

$$G(s) = \frac{s}{(Td \cdot s + 1)} \quad (11)$$
$$Td = 0.004$$

$$H(z) = \frac{0.5(1 - z^{-1})/\Delta T}{(1 - 0.5 z^{-1})}$$
$$f_s = 512 \text{ Hz}, \Delta T = 1/f_s$$

Figure 21:
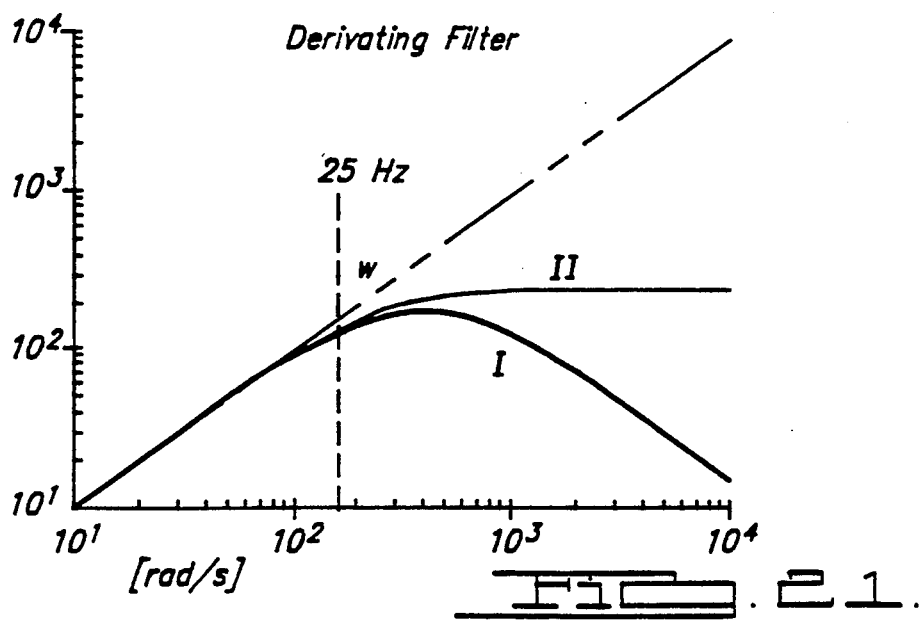
FIG. 21 graphically illustrates the frequency response of the derivating filters of FIG. 20.

With the time constant ($T_d$) set at 4 msec., filter 220 rolls off at around 40 Hz to a constant amplification. Using bilinear transformation, the digital equivalent has a simplified form for fast computation by the microprocessor. An exemplary sampling time for digital filter 220 is about 512 Hz with the cut-off frequency for the anti-aliasing filter (not shown) at about 250 Hz. The frequency response for filter 220 is shown in FIG. 21. As is apparent, filter 220 closely follows the "ideal" derivation curve "w" up to the desired high system frequency level of up to at least about 25 Hz.

Figure 22:
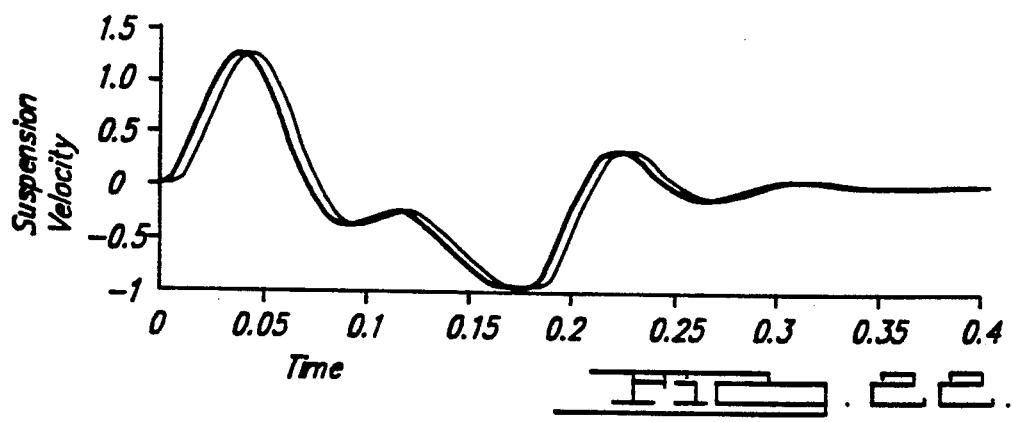
FIG. 22 is a comparison of the estimated and ideal time response for suspension velocity.

As seen from the exemplary plot of FIG. 22, an acceptable time delay of only about 3 msec. in the time response exists between the "ideal" and the estimated suspension velocity at the given sampling time.

Integration is sensitive to drift because of low frequency or steady state errors. An exemplary non-limiting integration control circuit for integrating roll acceleration Q to roll rate ($\dot{X}_3$) and roll angle ($\hat{X}_{10}$) is shown in FIG. 23. The first integration is performed by a filter 222 having a constant or high-pass characteristics for low frequencies. Above a certain predetermined design point, the frequency response of filter 222 follows the "ideal" slope of an integrator. (See FIG. 24). The body velocities for heave $\hat{x}_1$, pitch $\hat{x}_2$ and roll $\hat{x}_3$ are estimated by "integrating" their corresponding acceleration $\ddot{z}$, $\ddot{\theta}$, $\ddot{q}$ respectively. Since the velocity estimates represent the inertial damping of the vehicle body, the integration has to be highly accurate within the relatively low natural frequency range associated with body motion (i.e. 0.5 to 5 Hz).

The analog and digital transfer functions for filter 22 are:

$$G(s) = \frac{1}{(s + 1/T_1)} \quad (12)$$
$$T_1 = 2.0$$

$$H(z) = \frac{0.5(1 + z^{-1})/\Delta T}{(1 - a_1 z^{-1})}$$
$$f_s = 128 \text{ Hz}, \Delta T = 1/f_s$$
$$a_1 = 1 - \Delta T/T_1$$

Figure 24:
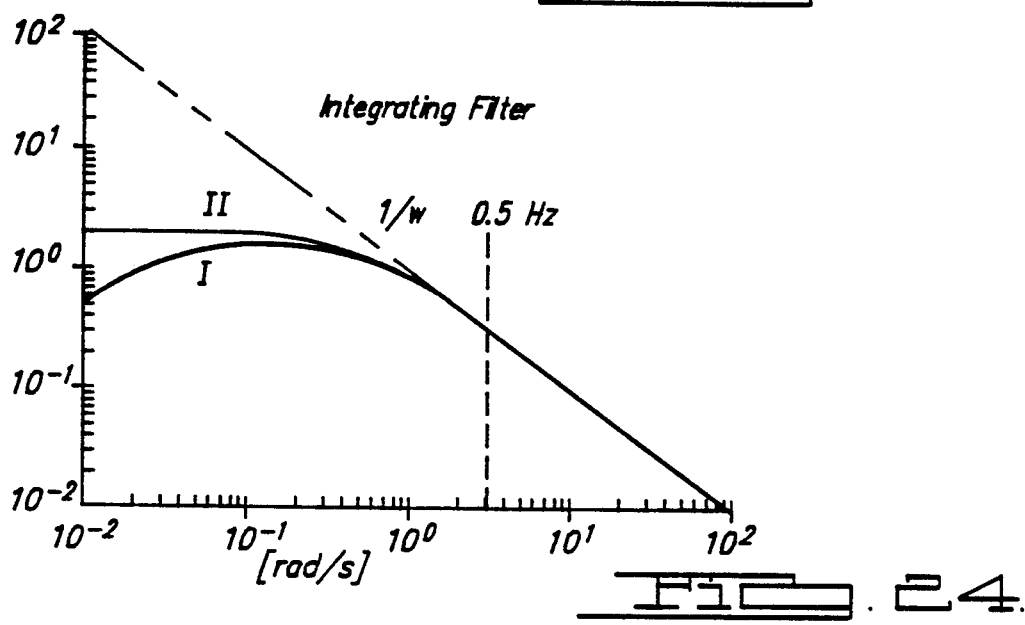
FIG. 24 illustrates the frequency response of the integrating filter circuit of FIG. 23.

Filter 222 is a low-pass filter scaled within the operating range above its cut off frequency. The time constant ($T_1$) is set to about 2.0 sec. which permits filter 222 to behave substantially as an "ideal" integrator within the specified frequency range. In order to "zero out" accelerometer 135 from its static offset, the input signal is high-pass filtered through a digital filter 223 having a relatively long time constant. FIG. 24 shows the effects of integrating filter 222 including high-pass filter 223 with a time constant of 10 sec. The "ideal" integration has a transfer function with the magnitude of 1/w and is included for comparison.

An improvement in the body velocity estimation scheme is provided to compensate each integration calculation with its respective low frequency component of the "average" suspension velocity ($Z_{susp}$), average suspension pitch rate ($\theta_{susp}$), and "average" suspension roll rate ($\phi_{susp}$). Such compensation has effect only at very low frequencies, for instance from disturbances like lane changes, braking or long wavelength undulation on a highway. The "average" suspension velocity and angular rates are calculated based on the estimated suspension velocities ($\hat{x}_4$ through $\hat{x}_7$) as follows:

$$\begin{bmatrix} Z_{susp} \\ O_{susp} \\ Q_{susp} \end{bmatrix} = \begin{bmatrix} -1/4 & -1/4 & -1/4 & -1/4 \\ 2/1 & 2/1 & -2/1 & -2/1 \\ -2/tw & 2/tw & 2/tw & -2/tw \end{bmatrix} \cdot \begin{bmatrix} \hat{x}_4 \\ \hat{x}_5 \\ \hat{x}_6 \\ \hat{x}_7 \end{bmatrix} \quad (13)$$

The summation 224 for the average suspension roll rate ($\phi_{susp}$) has the time constant as low-pass filter 222 used for integrating the roll acceleration (Q). Similarly, vertical body (heave) velocity $x_1$, and pitch rate $x_2$ can be estimated through substantially identical integration filtering of their corresponding acceleration signal.

The final three state variables estimated are vertical displacement ($\hat{x}_8$), pitch angle ($\hat{x}_9$) and roll angle ($\hat{x}_{10}$). As shown in FIG. 23, the estimation is performed by a second integating filter 230 which performs substantially identical to the first integration procedure herebefore presented with the input now being estimated roll angular velocity ($\hat{x}_3$) being integrated and "average" suspension roll angle ($\phi_{susp}$) being low-pass filtered and added thereto. Since the suspension displacements ($x_{11}$ through $x_{14}$) are measured directly, the "average" suspension displacement ($Z_{susp}$) and the angles ($O_{susp}$, $Q_{susp}$) can be expressed as:

$$\begin{bmatrix} Z_{susp} \\ O_{susp} \\ Q_{susp} \end{bmatrix} = \begin{bmatrix} -1/4 & -1/4 & -1/4 & -1/4 \\ 2/1 & 2/1 & -2/1 & -2/1 \\ -2/tw & 2/tw & 2/tw & -2/tw \end{bmatrix} \cdot \begin{bmatrix} x_{11} \\ x_{12} \\ x_{13} \\ x_{14} \end{bmatrix} \quad (14)$$

Preferably, the time constant ($T_3$) of integrating filter 230 for heave and pitch is about 1.0 sec. and for roll is about 0.25 sec. The time constant stimulates how fast a reference plane follows the road in each mode of motion. The shorter time constant for determination of the roll angle relates to the fact that roll angle $\hat{x}_{10}$ must converge faster for calculation of the "average" suspension roll angle.

The full state feedback regulation structure associated with "vehicle controller" 210 is obtained by feeding back the estimated state variables derived by the signal processor 208 to vehicle controller 210. The dynamics of observer 209 should not affect the dynamics of the vehicle specified by the feedback gains. This simplifies the analysis as the two control circuits for "dynamic leveling" loop 202 are now separable.

The poles of observer 209 are given by the time constants for the derivation and integration filters. The determination of the observer poles is a compromise between sensitivity to measurement errors and the need for rapid recovery from initial errors. In order to ensure that the integrating filters 222 ad 230 correspond satisfactorily with an "ideal" integration, the poles should be located close to origin but should be located along the negative real axis for rapid recovery from initial errors. Furthermore, the derivating filter 220 should be located as far out along the negative real axis as is possible for sensitivity to measurement errors.

An analysis of the impact of observer 209 on the vehicle dynamics can be made by expanding the A-matrix, describing the vehicle, with the ten state variables $X_1$ through $X_{10}$ estimated by observer 209. The feedback gain matrix is "shifted" over to the estimated state variables and the gains for each of the state variables are set to zero. The eigenvalues computed with the feedback matrix $G_{soft}$ (FIG. 19) for the closed loop A-matrix and the closed loop "expanded" A-matrix are shown in the table.

|  | Full state feedback | | Estimated state feedback | | Observer poles |
| --- | --- | --- | --- | --- | --- |
|  | $\xi\omega_o$ | $\pm\omega_o\sqrt{1-\xi^2}$ | $\xi\omega_o$ | $\pm\omega_o\sqrt{1-\xi^2}$ | $\xi\omega_o$ |
| Heave: | −4.23 | ±4.23i | −4.19 | ±4.24i | −0.5, −1 |
| Pitch: | −4.46 | ±4.46i | −4.43 | ±4.48i | −0.5, −1 |
| Roll: | −12.2 | ±12.3i | −12.4 | ±11.7i | −0.5, −4 |
| Wheel: | −7.74 | ±73.7i | −7.68 | ±74.0i | −250 |
| Wheel: | −7.75 | ±73.7i | −7.71 | ±73.9i | −250 |
| Wheel: | −8.1 | ±72.6i | −7.70 | ±73.1i | −250 |
| Wheel: | −7.46 | ±74.3i | −7.46 | ±74.3i | −250 |

The observer's 10 poles are all real poles and ordered to the related mode of motion. Comparison of the vehicle poles shows a maximum overall difference of 5% in roll motion, due to the pole of its second integrating filter being located at −4. This is due to the more rapid recovery of the roll angle towards the average suspension roll angle.

Observer 209 is based on input from a sensor configuration which includes transducers that are commercially available within a reasonable price range. As an alternative, a gyroscope located in the center of gravity for directly measuring the pitch and roll would minimize the need of a single accelerometer for vertical heave measurement.

Adaptive Control

Figure 25:
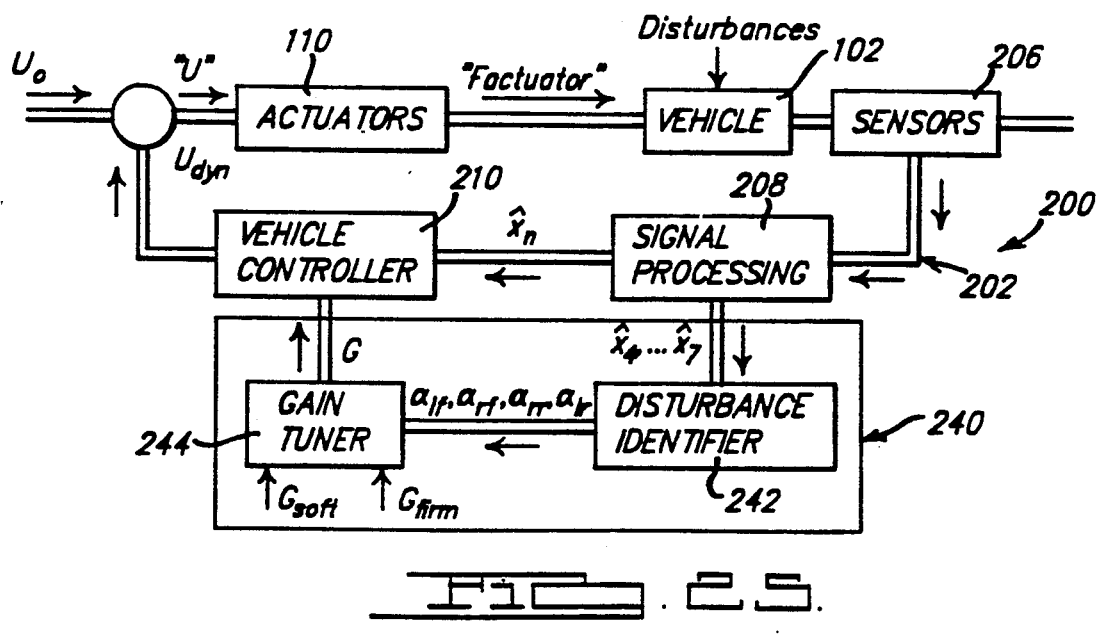
FIG. 25 is a block diagram of the adaptive control circuit of the present invention.

According to the present invention, an "adaptive" circuit is provided for tuning the "dynamic leveling" control loop 202. "Adaptive" control is the automatic self-tuning process of control loop 202 which is independent of the sensor configuration employed. With particular reference to FIG. 25, an additional self-tuning loop 240 is added to the control system 200. In general, the "adaptive" control loop 240 is employed to overcome the compromise between road holding and comfort. In short, the gains of feedback matrix "G" are being continuously recalculated to maintain "optimal" behavior.

Herebefore, several design techniques have been employed for suspension systems in which the adaptivity scheme was based on phase and/or amplitude margins, pole-placement control or LQG-control. What each has in common is that the parameters of the vehicle controller circuit are adjusted by an additional outer loop, which is composed of a recursive parameter estimator for describing the dynamic motion, and a calculator for calculating the new regulator gains.

Adaptive control scheme 240 according to the present invention is provided for maintaining good road holding over a wide range of road conditions. Since the frequency dependency of wheel damping is included in the feedback regulation of active suspension control structure 200, the adaptive scheme 240 is simple in structure for convenient implementation therein.

In particular, the adaptive scheme 240 for "dynamic leveling" control loop 202 is of a reversed character in comparison with conventional adaptive scheme. According to this invention, disturbances (the road) are identified and thereafter the dynamics of the vehicle are modified to "adapt" to the changes in environmental conditions.

As is known, soft suspension damping generates good road isolation but relatively poor road holding at frequencies around the wheel's natural frequency. Adaptation scheme 240 improves road holding by using the frequency dependency of the feedback gain matrix. Therefore, the adaptive scheme of the present invention combines good road holding from a "firm" suspension with good comfort from a "soft" suspension. In short, the adaptive mechanism 240 adjusts the gains for each corner actuator to increase or decrease only the suspension damping characteristics.

Adaptive loop 240 is divided into "disturbance identifier" 242 and "gain tuner" 244. Disturbance identifier 242 calculates a gain weighting coefficient ($\alpha$) for each corner which is based on the frequency and amplitude of the estimated suspension velocities $x_4$ through $x_7$. As is apparent, any sensor configuration or derived signal which produces suspension velocity outputs can be readily adapted for application of this adaptive concept. Gain tuner 244 contains the two feedback gain matrixes $g_{soft}$ and $G_{firm}$ from which a weighted linear combination "G" is derived and sent to vehicle controller 210.

Adaptive loop 240 is continuously calculating the four gain weighting coefficients ($\alpha_{lf}$, $\alpha_{rf}$, $\alpha_{rr}$, $\alpha_{lr}$), each representing the gain adjustment necessary for the corresponding corner actuator 110 at a given time. The magnitude of the weighting coefficient ($\alpha$) is scaled and saturated to be within the range (0–1). ($\alpha$) is close to zero for frequencies around the natural frequency of the vehicle body and near unity around the natural frequency of the wheel.

The linear combination of the two distinct gain matrices $G_{soft}$ and $G_{firm}$ within gain tuner 244 is derived from the general formula:

$$g = (1-\alpha) g_{soft} + \alpha\, g_{firm} \quad (15)$$

Therefore:

$$G = \begin{bmatrix} (1-\alpha_{lf}) & 0 & 0 & 0 \\ 0 & (1-\alpha_{rf}) & 0 & 0 \\ 0 & 0 & (1-\alpha_{rr}) & 0 \\ 0 & 0 & 0 & (1-\alpha_{lr}) \end{bmatrix} \cdot G_{soft} + \begin{bmatrix} \alpha_{rf} & 0 & 0 & 0 \\ 0 & \alpha_{lr} & 0 & 0 \\ 0 & 0 & \alpha_{rr} & 0 \\ 0 & 0 & 0 & \alpha_{lr} \end{bmatrix} \cdot G_{firm} \quad (15)$$

When ($\alpha$) has a magnitude of one, the resulting gain "G" is equal to $G_{firm}$ and when ($\alpha$) is zero, "G" is equal to the $G_{soft}$. The stiffness gains (columns 8–14 of FIG. 17) are the same for the two matrixes, therefore, they remain unchanged independent of the magnitude of ($\alpha$). The "effective" damping of the body (active inertial damping + wheel suspension damping) is likewise kept constant for both the $G_{soft}$ and the $G_{firm}$ matrices, with only the distribution between the inertia damping and suspension damping varying depending on the value of ($\alpha$).

Figure 26:
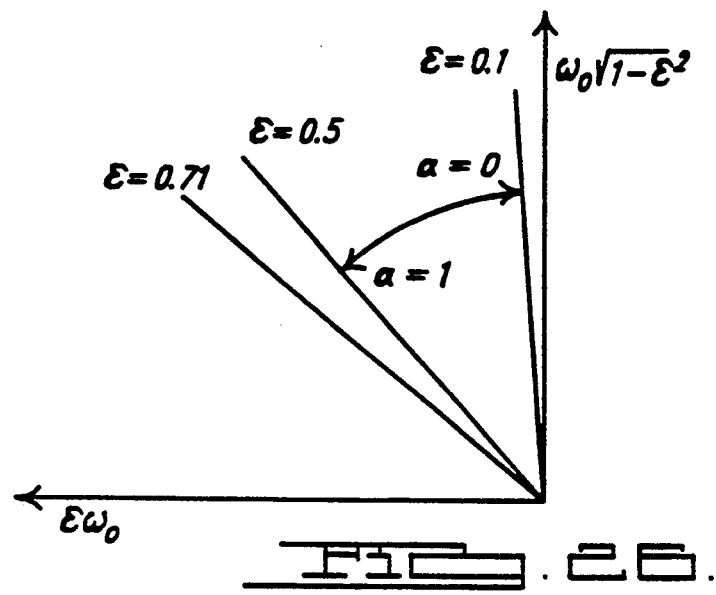
FIG. 26 graphically illustrates the effect of the gain adaption circuit on pole placement.

FIG. 26 illustrates the effect the adaptivity scheme has on the vehicle pole placement. The poles for the vehicle body remain constant while the poles for the unsprung masses (wheels) move along an arc between the E=0.1 and the E=0.5 line.

Figure 27:
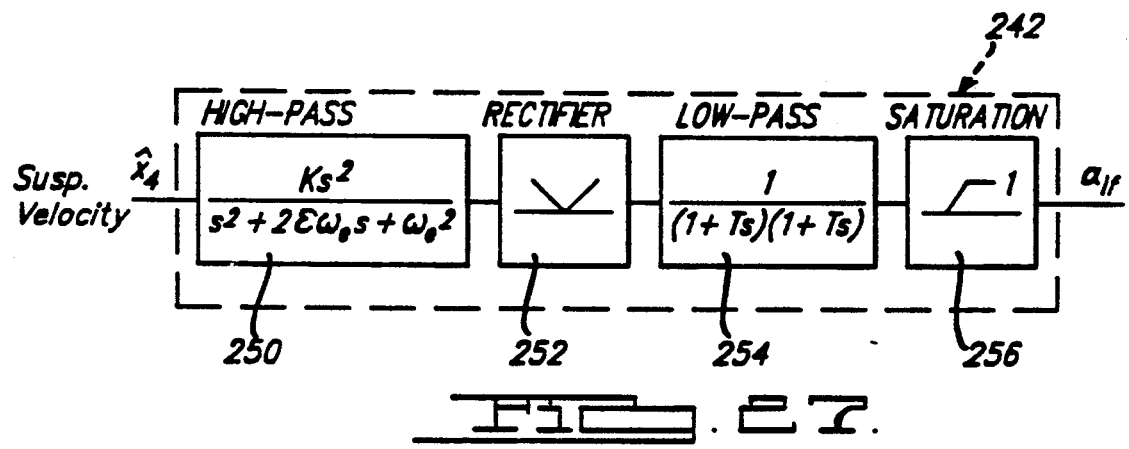
FIG. 27 is a block diagram of a circuit for calculating the gain weighting coefficient.

Referring now to FIG. 27, the frequency dependency of disturbance identifier 242 is generated by first passing the input signals ($\dot{x}_4$ through $\dot{x}_7$) through an underdamped high-pass filter 250, tuned to set its maximum amplification to about the wheel's resonance frequency. Filter 250 is of second order with relative damping for generating good attenuation of suspension movement around the body frequencies as well as a narrow resonance peak. A vehicle's wheel resonance frequency is a product of the vehicle itself and further more is generally different from the front to the rear of the vehicle. High pass filter 250 must therefore be tuned specifically for each vehicular application.

Preferably, filter 250 is a recursive digital filter with a sampling rate set at about 125 Hz. Therefore, every ⅛th millisecond the ($\alpha$) values are updated. The high sampling rate is necessary so that the gains associated with gain tuner 244 are only adjusted in small increments to provide a relatively smooth transition.

Figure 28:
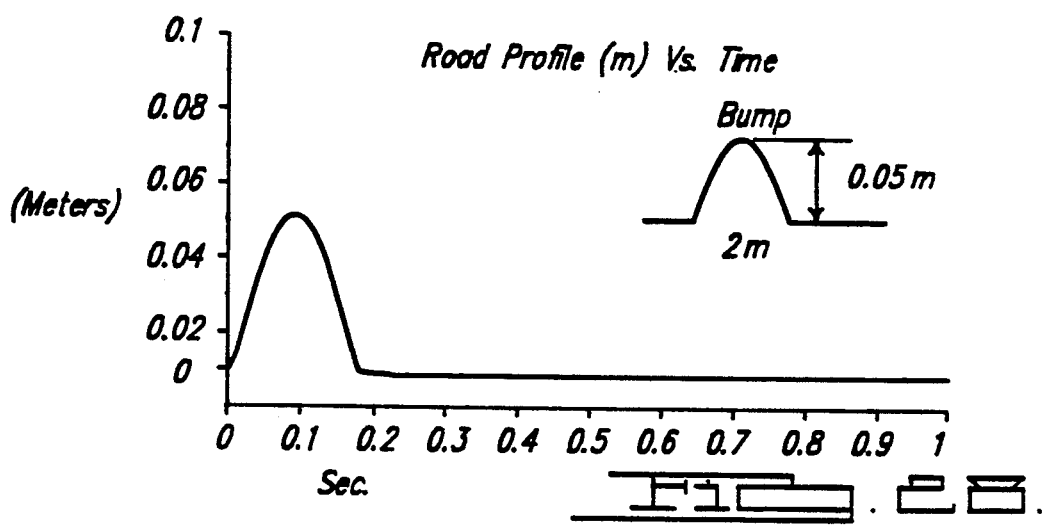
FIG. 28 is an exemplary plot of road profile versus time.

Three additional signal processing "blocks" are provided after high pass filter 250. Rectifier block 252 rectifies the filtered signal by taking its absolute value. The next "block" is a second order "real poles" low pass filter 254. The final block 256 saturates the signal for maximizing its output to 1. While FIG. 28 illustrates the block diagram for calculating ($\alpha_{lf}$) from input of the left front suspension velocity ($\dot{x}_4$), the identical procedure is applied to the other corners of the vehicle. The magnitude of ($\alpha$) is always positive and can be looked upon as a moving average of the rectified signal.

Figure 29:
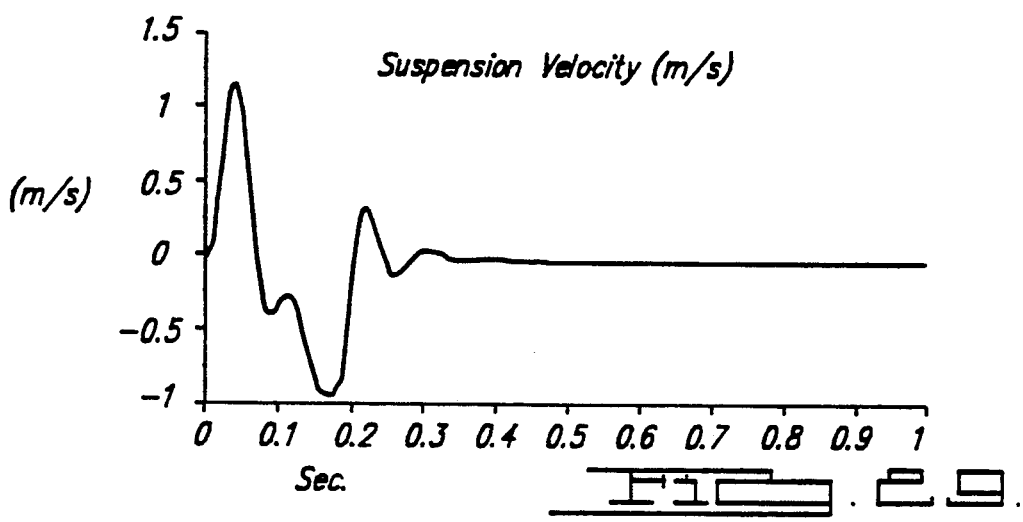
FIG. 29 is a plot of suspension velocity from FIG. 28.
Figure 30:
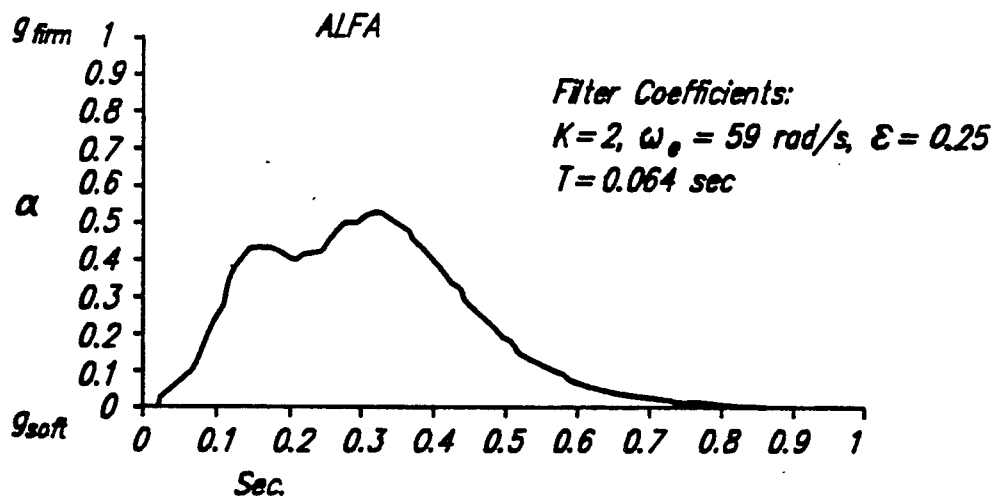
FIG. 30 is a plot of the gain weighting coefficient ($\alpha$) generated from the suspension velocity of FIG. 29.

Simulation of vehicle 102 passing a bump provides a good illustration of the performance of the ($\alpha$) value. FIGS. 28 through 30 provide an exemplary situation, with filter 250 having a constant input frequency of 9 Hz and an amplitude of 0.4. The input is a bump of 0.05 meters in height and 2 meters long. The vehicle is driven at 40 km/h, such that the wheels pass the bump in 0.18 sec. (see FIG. 28). The desired performance of the suspension is to permit the wheels to absorb the impact of the bump with a soft suspension and then slowly increase the wheel damping to prevent the wheels from bouncing and losing tire to ground contact. The three diagrams in FIGS. 28 through 30 display the road profile versus time, suspension velocity and the gain weighting coefficient ($\alpha$) respectively. The suspension velocity (FIG. 29) is the input to disturbance identifier 242 and ($\alpha$) is the output.

Actuator Controller

The actuator control strategy and hardware configuration of the present invention are fundamental to the improved characteristics of low power active suspension system 100. A primary principle of actuator 110 and its control strategy is the division of the power requirements into the "dissipation" and "addition" of power. "Dissipation" of power is controlled by infinitely variable damper valve 156 within actuators 110.

The "addition" of power is controlled by selective energization of external servo valve 130. The result is the intermittent opening and closing of servo valve 130 to add or subtract energy to or from actuator 110.

Figure 31:
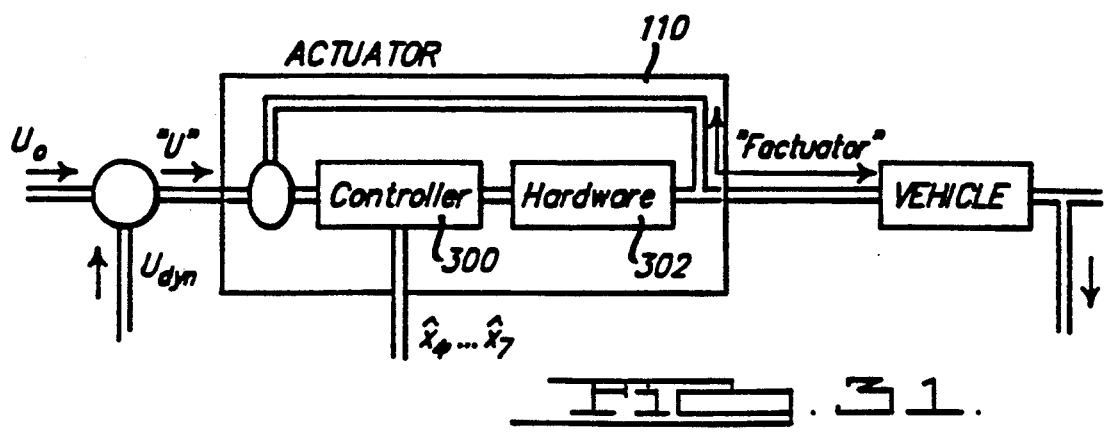
FIG. 31 is a block diagram of an actuator control system according to the present invention.

Referring to FIG. 31, actuator 110 is a "slave" which is commanded to produce force "U" from a summation of the dynamic leveling force $U_{dyn}$ and the load leveling force $U_o$. Actuator 110 is schematically illustrated as including an actuator controller 300 and its driving circuit hardware 302. Preferably, actuator 110 is physically mounted between the sprung and unsprung masses and can support the sprung mass with or without application of a passive support member such as a helical spring. More preferably, a passive coil spring assists in supporting the vehicle body.

As noted from FIG. 8, hydro-pneumatic actuator 110 communicates with accumulator 128. For a given flow through piston 148, the flow restriction through damper valve 156 can be set to generate any force within its upper and lower limit. When a desired force is outside of the limits of damper valve 156, servo valve 130 is actuated. Servo valve 130 is either supplying actuator 110 with high pressure fluid or emptying actuator 110 of fluid which is returned to reservoir 140.

The force generated by actuator 110 is the sum of the accumulator and piston force.

$$F_{actuator} = F_{acc} + F_{piston}$$

Where:
$F_{piston} = C \cdot Q_{piston}$
$Q_{piston} = Q_{rel} + Q_{serv}$
$Q_{rel} = V_{rel} \cdot A_{piston}$
$F_{acc} = p_{acc} \cdot A_{rod}$
$p_{acc} = Konst/V_{acc}^k$
$F_{piston}$ = Actuator force from piston
C = Characteristic of damper valve
$C_{com}$ = Commanded setting of damper valve
$Q_{piston}$ = Hydr. flow through damper valve
$Q_{rel}$ = Hydr. flow by suspension velocity
$Q_{serv}$ = Hydr. flow from servo valve
$Q_{com}$ = Commanded flow
$F_{acc}$ = Actuator force from accumulator pressure
$p_{acc}$ = Accumulator pressure
$V_{acc}$ = Volume of gas in accumulator The accumulator pressure $p_{acc}$ is dependant on the level of compression of the gas confined within accumulator 128. During rapid changes to the gas volume within accumulator 128, the process can be described as adiabatic with the following formula:

$$p_{acc} V_{acc}^k = konst, \text{ where } k = 1.4 \quad (16)$$

During slower changes in the gas volume within accumulator 128, heat is transferred to the surroundings and the process is regulated by the following formula:

$$P_{acc} V_{acc}/T = konst. \quad (17)$$

The piston force $F_{piston}$ is generated by the pressure drop across piston 148 which is caused by the flow restriction generated by valve 156. The flow restriction is a generally linear relationship between force and flow which is denoted as characteristic "C". Adjustment of damper valve 156 generates an increase or decrease of "C" between the upper and lower limits $C_{firm}$ and $C_{soft}$.

Therefore: $F_{piston} = C \cdot Q_{piston}$ (18)

The relative flow $Q_{rel}$ is defined as the volume/second flow of hydraulic fluid associated with the relative movement between actuator cylinder 144 and piston 148. The flow through piston 148 is the sum of the flow caused by the relative velocity of the suspension $Q_{rel}$ and the flow from the servo valve $Q_{serv}$.

$$Q_{piston} = Q_{rel} + Q_{serv} \quad (19)$$

Therefore, by selectively controlling the flow to or from servo valve 130, flow across piston 148 can be controlled such that the piston force $F_{piston}$ can be generated independent of suspension movement.

Infinitely variable damper valve 156, located in piston 148, can be continuously controlled within its upper and lower limit $C_{firm}$ and $C_{soft}$, respectively. A control signal $C_{com}$ from the actuator controller 300 energizes the actuator's driving circuit 302 to adjust valve 156 to either characteristic. The "soft" characteristic is performed by valve 156 with its driving circuit inactivated. The "firm" characteristic is performed with maximum output from its driving circuit. In order to save power and avoid unnecessary activation of servo valve 130, the gain values in the "G" matrix (adaptively derived from $G_{soft}$ and $G_{firm}$ from gain tuner 244 of adaptive loop 240) relating to suspension velocities ($\dot{x}_4$ to $\dot{x}_7$) must be within the limits of damper valve 156.

Actuator 110 has a passive spring constant $k_{act}$ which is regulated by the volume of fluid displaced by piston rod 150 within working chamber 146. During compression, rod 150 moves telescopically into housing 144 such that the additional volume compresses the accumulator gas volume and increases the accumulator pressure. Therefore, the actuator's spring constant $k_{act}$ is dependent on the pressure in, and the size of, accumulator 128 and the area of piston rod 150. The spring rate can be approximated as linear for a specific load condition.

The actuator spring constant $k_{act}$ generates a force proportional to the suspension displacement without any activation of damper valve 156 or servo valve 130. Since this force is measured by the force transducer or pressure sensor within actuator 110, it must be demanded by the control system. The gain matrices $G_{soft}$ and $G_{firm}$ include gain values for each suspension displacement ($x_{11}$ to $x_{14}$), corresponding to the actuator spring constant $k_{act}$ in the corner of the vehicle.

The actuator controller 300 is adapted to track the demanded force "U" by simultaneously controlling the setting of servo valve 130 and damper valve 156. Accordingly, power is saved by only using damper valve 156 for "dissipative" power demands and servo valve 130 for the "addition or release" of power when needed.

The demanded force "U" is generated by the accumulator force $F_{acc}$ and the piston force $F_{piston}$. The difference between the demanded force "U" and the accumulator force $F_{acc}$ defines the piston force to be generated by servo valve 130 and damper valve 156. Therefore:

$$F_{piston} = U - F_{acc} \quad (20)$$

The piston force is generated by flow through piston valving 156 and its corresponding damping characteristic "C", such that:

$$U - F_{acc} = C \cdot (Q_{rel} + Q_{serv}) \quad (21)$$

The working principle of actuator controller 300 is to dissipate or add power to the suspension. The energy used is either derived from the kinetic energy of the vehicle's vertical motion or from the central pressure source 132. The working principle of actuator controller can be divided into four cases which correspond to the four quadrants of FIG. 32. They are:

I. Suspension is in compression: The kinetic energy of the vehicle's vertical motion is attenuated and converted into heat. (Power is dissipated).

II. Suspension is in expansion: Energy is added to the suspension from central pressure source 132 (fluid flows through servo valve 130). The energy is converted into kinetic energy and accumulated as potential energy in accumulator 128.

III. Suspension is in expansion. The kinetic energy of the vehicle's vertical motion is attenuated and converted into heat. (Power is dissipated).

IV. Stored potential energy in accumulator 128 is released (hydraulic fluid exits actuator 110 and returns to reservoir 134). The potential energy is converted into kinetic energy and heat.

As mentioned, the four cases described each represent one quadrant of FIG. 32. The y-axis represents the desired force "U", with its origin at the magnitude of the accumulator force. The x-axis represents the relative flow $Q_{rel}$. It should be noted that the accumulator force $F_{acc}$ is not constant, since the working range of damper valve 156 is continuously moving up and down.

Case I and III above represent "dissipation" of power. As such, no flow from servo valve 130 is required and the flow through the piston, $Q_{piston}$ is the same as the flow generated by the relative suspension velocity $Q_{rel}$. Except for supplying additional accumulator force, actuator 110 now works as a semi-active actuator with infinitely variable damping between its upper and lower limit $C_{soft}$ and $C_{firm}$.

Point 1, (FIG. 32) is an example of a demanded force "U" which is located in quadrant I. The relative flow $Q_{rel}$ is positive whereby actuator 110 is in compression. Damper valve 156 is capable of increasing the piston force $F_{piston}$ from the level of the accumulator force $F_{acc}$ to the demanded level. Since the relative motion has the same polarity as the desired force, the desired force "U" is achieved by adding resistance to the motion. Therefore, adjustment of damper valve 156 is shown along line "C".

In cases II and IV adjustment of damper valve 156 is not sufficient and external flow through damper valve 156 is required. The effect of the flow from servo valve 130 is shown in FIG. 33. Flow from servo valve 130 into actuator 110 is defined as "positive" and acts to shift the working range of damper valve 156 to the left along the x-axis ($Q_{rel}$). Likewise, a "negative" flow out of actuator 110 would shift the working range to right. Shifting of the working range of damper valve 156 makes it possible to generate the desired force "U" using the upper and lower limits of damper valve 156. With damper valve 156 set to "firm", the desired force is achieved with the lowest piston flow rate and therefore with the lowest flow requirement from servo valve 130.

Point "2" (FIGS. 32 and 33) illustrates an example of Case II wherein the demanded force "U" is positive and the relative motion is negative, i.e., the actuator in extension. During expansion, the volume in working chamber 146 under piston 148 increases with the rate $Q_{rel}$. For a regular passive shock absorber, flow would be directed from the upper chamber above the piston to the lower chamber such that the force generated would then be in quadrant III. However, to create a positive force during expansion, flow through piston valving 156 must be directed in the opposite direction. Therefore, flow from servo valve 130 into actuator 110 must be larger than the relative flow $Q_{rel}$.

In those instances when the demanded force "U" is within quadrants I and III but outside the limits of damper valve 156 (See example points 3 and 4 of FIG. 32), external flow through servo valve 130 is required to satisfy the demand.

Actuator Controller System

Figure 34:
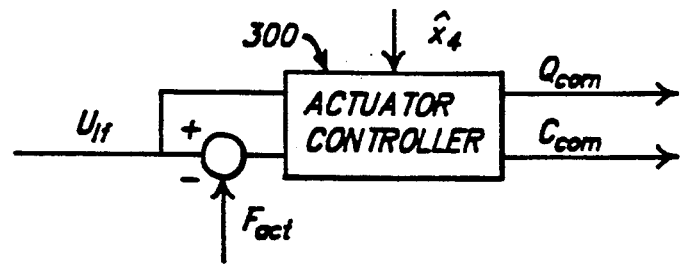
FIG. 34 is a block diagram of a control system for the actuator controller of the present invention.

The actuator control system 300 (FIG. 31) is designed to perform according to the principle presented by calculating the commanded flow for the servo valve $Q_{serv}$ and the commanded damper setting for the damper valve $C_{com}$. Actuator controller circuit 300, illustrated in greater detail in FIG. 34, has as inputs the commanded force "U" and the measured actuator force $F_{actuator}$. The control for servo valve 130 is an open loop with the gain adjusted according to the power demand. The control for damper valve 156 is preferably a PI-controller with the actuator force $F_{actuator}$ as feedback.

Other variables inputted into actuator controlled 300 are the accumulator force $F_{acc}$ and the relative flow $Q_{rel}$. Since both variables are not directly measured they must be estimated. The estimation of the accumulator force $F_{acc}$ is made by low-pass filtering of the actuator force $F_{actuator}$ and by estimating the accumulator volume change. Relative flow $Q_{rel}$ is estimated by multiplying the estimated suspension velocities ($\dot{x}_4$ through $\dot{x}_7$ inputted from "observer" 208) by the area of piston 148.

The actuator controller cycle time is set to be about four times faster than the "dynamic leveling" loop 202. To follow the demanded force "U" during each cycle, a new command signal $Q_{com}$ and $C_{com}$ is calculated for the flow and damper settings, respectively. To generate the command signals, the actuator control scheme is divided into three steps:

A. Power identification;
B. Control of servo valve 130; and
C. Control of damper valve 156.

Actuation of servo valve 130 is dependent on the "location" of the demanded force "U" in relation to the relative flow $Q_{rel}$. The location is identified by a quotient C', calculated as the ratio between the desired piston force (U−$F_{acc}$) and the relative flow $Q_{rel}$, wherein:

$$C' = (U - F_{acc})/Q_{rel} \qquad (22)$$

Figure 35:
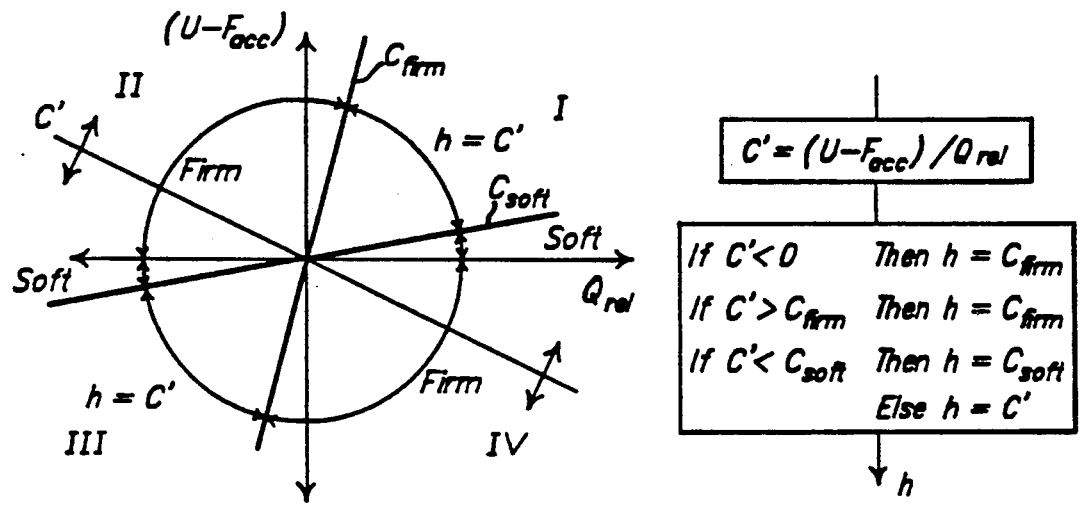
FIG. 35 is a graphical illustration of the power identification function of the actuator controller.

Referring to FIG. 35, the sign and magnitude of the quotient C' indicates a fictive damping characteristic used as a gain "h" to calculate the commanded force from servo valve 130. However, gain "h" must be within the upper and lower limit of damper valve 156.

If the quotient C' is negative (C'<0), the desired piston force is located in quadrants II or IV and external flow through servo valve 130 is required (in or out of actuator 110). In particular, when actuator 110 i sin expansion, fluid is added into lower portion 154 of working chamber 146 and when actuator 110 is in compression, fluid is exhausted from lower portion 154 through servo valve 130. Therefore, in order to achieve the required force with a minimum of additional flow, damper valve 156 should be set to "firm" and the gain "h" for servo valve 130 set of $C_{firm}$.

If the quotient C' is larger than $C_{firm}$ (C'>$C_{firm}$), the desired piston force is in quadrants I or III. However, the "firm" characteristic of damper valve 156 is not sufficiently firm and the desired force is only achieved by actively "increasing" flow through piston valve 156 via external flow through servo valve 130. To "increase" flow when actuator 110 is in expansion, fluid is exhausted from lower portion 154 to reservoir 140 through servo valve 130. To "increase" flow during a compression stroke, fluid is added from hydraulic system 132 into lower portion 154 of working chamber 146 through servo valve 130. Therefore, the gain "h" to servo valve 130 is set to $C_{firm}$.

If the quotient C' is smaller than $C_{soft}$ (C'<$C_{soft}$), the desired piston force in quadrants I or III. However, the "soft" characteristic of damper valve 156 is not sufficiently soft and the desired force is achieved by actively "decreasing" the piston flow through valve 156. In particular, when actuator 110 is in expansion, "decreased" flow across valve 156 is generated by adding fluid to lower portion 154 of working chamber 146. In addition, "decreased" flow is generated when actuator 110 is in compression by exhausting fluid from lower portion 154 back to reservoir tank 140. Therefore, the gain "h" to servo valve 130 is set to $C_{soft}$.

If the quotient C' is within the limits of the damper valve 156 itself, the desired piston force can be generated simply by selective adjustment of damper valve 156 and the gain "h" is set to C'.

Preferably, servo valve 130 has an open control loop, which uses direct calculations based on the gain "h", relative flow $Q_{rel}$ and the required piston force (U—$F_{acc}$). With the gain "h" as the ideal damping characteristic of damper valve 156, the necessary piston flow $Q_{piston}$ can be calculated based on the equation:

$$Q_{piston}=(U-F_{acc})/h \quad (23)$$

Since the difference between piston flow $Q_{piston}$ and the relative flow $Q_{rel}$ is the commanded flow from servo valve 130 it follows:

$$Q_{com}=(U-F_{acc})/h-Q_{rel} \quad (24)$$

When the desired force "U" is within the limits of damper valve 156, the gain "h" is assigned the value of the quotient C'. Therefore, by replacing "h" in equation (23) by the right side of equation (22), the commanded flow from servo valve is zero.

Figure 36:
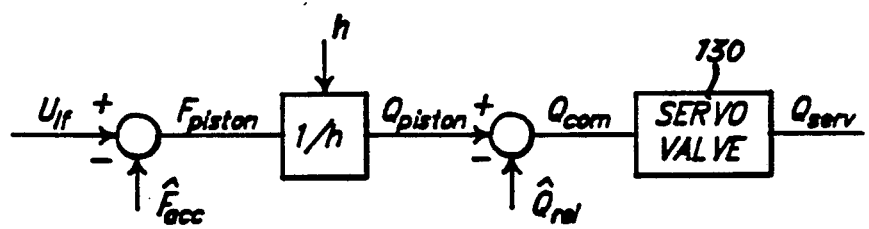
FIG. 36 is a block diagram of the control structure for the servo valves.

FIG. 36 illustrates a portion of actuator controller circuit 300 for controlling servo valve 130 using the equations herebefore detailed. FIG. 37 is a graph which illustrates the desired piston force plotted against the relative flow which forms an ellipsoidal curve, running clockwise through each quadrant of damper valve's 156 working area. The control strategy for servo valve 130 results in the following modes of actuation:

a-b: Actuator 110 is working as a variable damper;
b-c: Flow "out" of actuator 110 through servo valve 130;
c-d: Actuator 110 is working as a variable damper;
d-a: Flow "into" actuator 110 from the servo valve 130.

An example of the actuation "duty" cycle of servo valve 130 during an entire cycle a-a is shown in FIG. 38. The time period d-a represents only about 20% of the complete duty cycle a-a and in the only time when energy is transferred from central pressure source 132 for addition into actuator 110. The dynamics of servo valve 130 cause a time delay between the commanded flow (dashed line) and the actual flow.

Under "ideal" conditions, the gain "h", used in the control of the servo valve 130, could be used as the commanded damper setting. However, nonlinearities, time delays and estimation errors make it preferable to control damper valve 156 with a closed control loop which feeds back the actual actuator force $F_{actuator}$.

Figure 39:
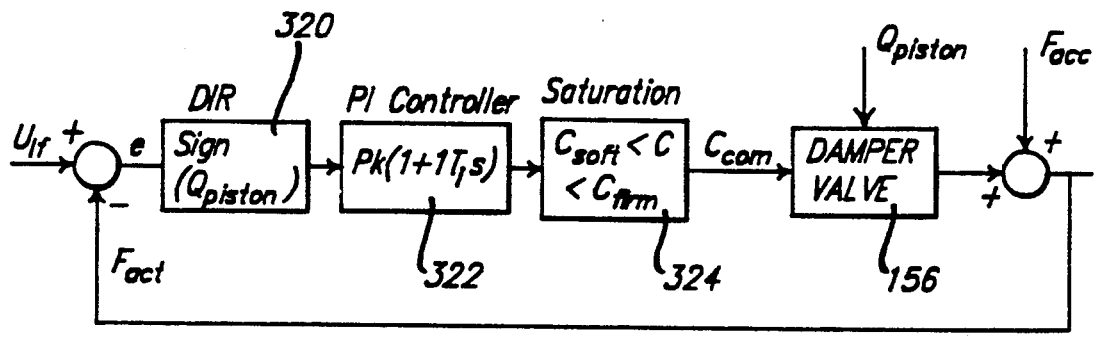
FIG. 39 is a block diagram of the control circuit for the continuously variable damper valve.

The block diagram of FIG. 39 shows the control scheme associated with actuator controller 300 for damper valve 156. The error "e" between the commanded force "U" and the actuator force $F_{actuator}$ is corrected to account for the direction of the piston flow (DIR=1 or −1) in block 320. The second block 322 is a PI-controller and third block 324 saturates the commanded signal $C_{com}$ to be within the limits of the damper valve 156.

The correction of "e" to the sign of the piston flow is necessary since the flow through piston valve 156 is bidirectional. An incremental change in the damper characteristic results in an incremental increase in the force from a positive piston flow (a flow from lower chamber 154 below piston 148 to upper chamber 152 above the piston). However, if the flow is negative, the resultant incremental change is a decrease in the force.

The PI-controller 324 is tuned for as fast a response as possible. The piston flow $Q_{piston}$ works in the control loop as a separate gain between the damper setting and the piston force. The frequency response of the closed control loop is dependent on the current piston flow.

Figure 40:
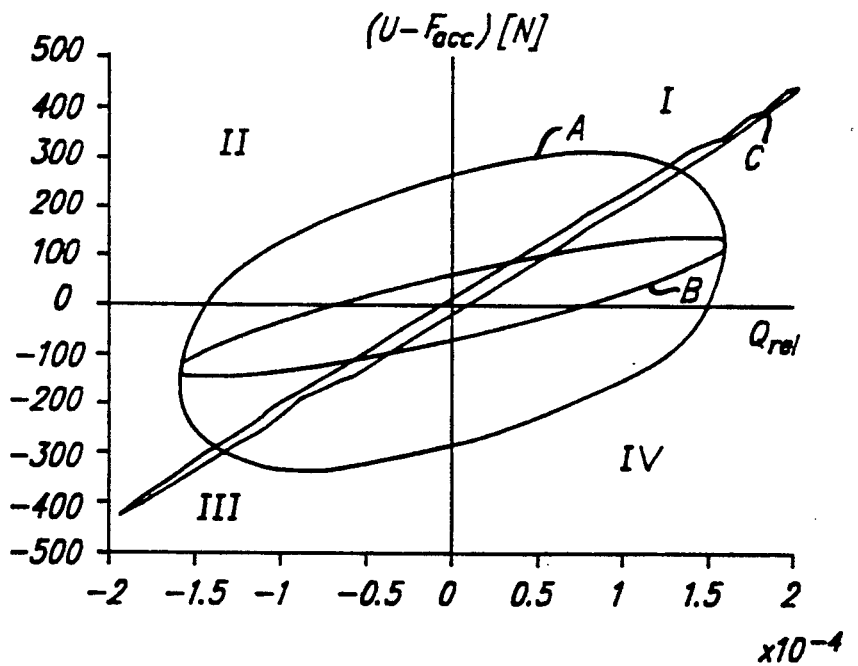
FIG. 40 is a graphical illustration plotting piston force versus relative flow for various road input frequencies.

As frequency increases, body movement decreases and suspension movement is derived mainly from the wheel. At road disturbance frequencies above about 6 Hz, the commanded force "U" is generally about 95% within the reach of damper valve 156. At these high frequencies, the force requirement becomes proportional to the relative flow, (see curve C in FIG. 40) i.e., the damper setting is close to constant and no flow from servo valve 30 is required.

Power Consumption

The power consumption of actuator 110 is measured as "peak" power consumption and "average" power consumption. Power consumption of actuator 110 is defined as the actuator force multiplied by the relative velocity of the suspension:

$$P_{actuator}=F_{act} V_{rel} \quad (25)$$

The power consumption of interest for the dynamic leveling systems of the present invention is the hydraulic power consumption taken from central hydraulic system 136 and consumed by each actuator 110. This occurs only when the demanded force "U" is in quadrant II (FIGS. 37 and 40) when additional flow is supplied into actuator 110. The power consumption for the "system" is defined as:

$$P_{system}=P_{system} Q_{serv} \text{ (for } Q_{serv}>0)$$

the system pressure $p_{system}$ is the pressure which is maintained by central pressure source 132. To minimize power consumption, the system pressure should be designed to be as low as possible yet large enough to support actuators 110 under the most extreme conditions.

The present invention produces a substantial reduction in peak flow and peak power requirements that are necessary to dynamically adjust vehicle body heights variations as compared to conventional active suspension systems. The restricted flow "assists" the flow control means in responding to vehicle attitude changes. This "assistance" promotes reduced system flow and power requirements while generating improved reaction time characteristics. Additionally, utilization of independent actuators 110 at each suspension corner provides improved overall vehicle attitude control in response to both vertical and lateral motion of the vehicle body.

While it is apparent that the preferred embodiments illustrated herein are well calculated to fill the objects stated above, it will be appreciated that the present invention is susceptible to modification, variation and change without departing from the scope of the invention.

What is claimed is:

1. A suspension system for a motor vehicle comprising:
   a hydraulic actuator operably connected between the sprung and unsprung portions of the vehicle, said hydraulic actuator having a working chamber secured to one of the sprung and unsprung portions of the vehicle, a piston disposed for translational movement within said working chamber, and means for coupling said piston to the other of the spring and unsprung portions of the vehicle;
   sensor means for sensing the dynamic motion of the sprung and unsprung portions of the vehicle and generating sensor output signals in response thereto;
   signal processing means for calculating a command signal in response to said sensor output signals;
   first valving means for generating an actuator output force as a function of the pressure differential across said piston in said working chamber when said command signal is within a predetermined range;
   second valving means for controlling the flow of fluid between said working chamber and a hydraulic fluid source for generating said actuator output force when said command signal is outside of said predetermined range; and
   controller means for selectively actuating at least one of said first and second valving means for generating said actuator output force in response to said command signal.

2. The suspension system of claim 1, wherein said first valving means is operable to regulate the damping characteristic of said hydraulic actuator between a minimum limit and a maximum limit so as to define said predetermined range, and wherein said second valving means is adapted to selectively add or exhaust hydraulic fluid to said working chamber when said actuator output force can not be generated solely by actuation of said first valving means.

3. The suspension system of claim 1, wherein said controller means includes a dynamic leveling circuit for generating a first output signal and a load leveling circuit for generating a second output signal such that the command signal is the sum of said first and second output signals.

4. The suspension system of claim 3, wherein said dynamic leveling circuit includes said signal processing means for processing said sensor output signals to generate a state variable vector $X_n$ representing the velocity and displacement of the sprung and unsprung portions of the vehicle, said dynamic leveling circuit further including vehicle controller means having a feedback gain matrix $G_n$ defining stiffness and damping characteristics based on predetermined vehicle dynamic performance requirements such that said vehicle controller means receives an output from said signal processing means for calculating said first output signal to equal $-G_n(X_n)$.

5. The suspension system of claim 4 further comprising gain adaption means for continuously modifying said feedback gain matrix $G_n$.

6. The suspension system of claim 1, wherein said sensor means include a relative position sensor located at each corner of the vehicle between its sprung and unsprung portions for measuring the relative displacement therebetween, and accelerometer means adapted for measuring the heave, pitch and roll acceleration of the sprung portion of the vehicle.

7. The suspension system of claim 2 further comprising an accumulator in fluid communication with said working chamber on one side of said piston, said second valving means comprising a flow control valve in fluid communication with said working chamber on an opposite side of said piston, said first valving means comprising a variable piston damper valve for generating a variable flow restriction across said piston and wherein said hydraulic fluid source includes a central pump and an accumulator for supplying high pressure damping fluid to said flow control valve for delivery to said working chamber, and a reservoir tank for receiving damping fluid exhausted through said flow control valve from said working chamber.

8. The suspension system of claim 7, wherein said controller means further comprises an actuator controller circuit adapted to receive said command signal for selectively controlling actuation of said variable piston damper valve and said flow control valve, whereby power requirements for the suspension system are reduced by actuating only said piston damper valve for dissipative power demands within said valve limits such that said flow control valve is actuated only when said power demand is outside of the limits of said piston damper valve for adding or subtracting power to said actuator.

9. A suspension system for a motor vehicle comprising:
   a hydraulic actuator operably connected at each corner of the vehicle between the sprung and unsprung portions thereof;
   means for detecting movement of the sprung and unsprung portions of the motor vehicle and for deriving a force signal for each actuator in response thereto; and
   a valving arrangement for causing said hydraulic actuator to generate a desired output force in response to said force signal, said valving arrangement including first valving means operable for generating said output force by selectively varying the damping characteristics of said hydraulic actuator when said force signal is within a predetermined range, and second valving means for selectively controlling the supply and discharge of hydraulic fluid from said hydraulic actuator for generating said output force when said force signal is outside of said predetermined range.

10. The suspension system of claim 9, wherein said hydraulic actuator has a working chamber secured to one of said sprung and unsprung portions and a piston assembly disposed for translation movement within said working chamber and secured to the other of said sprung and unsprung portions, said piston assembly defining first and second portions of said working chamber, said first valving means operable to generate said output force as a function of the pressure differential between said first and second portions of said working chamber, and said second valving means operable to selectively add and discharge hydraulic fluid from one of said first and second portions of said working chamber to selectively increase or decrease the magnitude of said actuator force generated by said first valving means.

11. The suspension system of claim 9 further comprising controller means having a dynamic leveling circuit for generating a first output signal and a load leveling circuit for generating a second output signal such that said force signal is the sum of said first and second output signals.

12. The suspension system of claim 11, wherein said dynamic leveling circuit includes signal processing means for processing output signals from said detecting means to generate a state variable vector $S_n$ representing the velocity and displacement of the sprung and unsprung portions of the vehicle, said dynamic leveling circuit further including vehicle controller means having a feedback gain matrix $G_n$ defining stiffness and damping characteristics based on predetermined vehicle dynamic performance requirements such that said vehicle controller means receives an output from said signal processing means for calculating said first output signal to equal $-G_n(X_n)$.

13. The suspension system of claim 10 further comprising an accumulator in fluid communication with said first portion of said working chamber, said second valving means is a flow control valve in fluid communication with said second portion of said working chamber, said first valving means is a variable piston damper operable for generating a variable flow restriction across said piston, and a hydraulic fluid source includes a central pump and an accumulator for supplying high pressure hydraulic fluid to said flow control valve for delivery to said working chamber, and a reservoir tank for receiving hydraulic fluid exhausted through said flow control valve from said working chamber.

14. An active suspension system for a motor vehicle comprising:
a source of high pressure damping fluid;
a hydraulic damper operably connected between the unsprung and sprung portions of the vehicle at each corner thereof, said hydraulic damper forming a working chamber operable to store damping fluid therein and secured to one of the sprung and unsprung portions of the vehicle, and a piston and rod assembly disposed for translational movement within said working chamber with opposite sides of said piston defining first and second portions thereof, said rod secured at an end opposite said piston to the other of the sprung and unsprung portions of the vehicle;
sensor means for sensing the dynamic movement of said sprung and unsprung portions of the vehicle and generating sensor output signals in response thereto;
semi-active valving means for selectively regulating the damped resistance to movement of said piston within said working chamber between a minimum limit and a maximum limit;
flow control means fluidly connecting one of said first and second portions of said working chamber to said source of high pressure fluid for controlling the flow of damping fluid therebetween;
an accumulator in fluid communication with the other of said first and second portions of said working chamber; and
controller means for calculating a commanded force signal in response to said sensor output signals, said control means further operable to selectively actuate said semi-active valving means for generating an actuator output force when said commanded force signal is between said minimum and maximum limits and for actuating said flow control means in conjunction with said semi-active valve means when said commanded force signal is outside of said limits.

15. The active suspension system of claim 14, wherein said semi-active valving means comprises variable flow restriction valving associated with said piston which can be selectively modulated between a maximum flow restriction and a minimum flow restriction for generating said actuator output force.

16. A method of dynamically leveling the attitude of a motor vehicle comprising the steps of:
connecting a hydraulic actuator at each corner of the vehicle between its sprung and unsprung portions;
sensing movement of the sprung and unsprung portions of the vehicle and generating sensor output signals in response thereto;
calculating a demanded force signal for each actuator in response to said sensor output signals;
leveling the attitude of the vehicle by regulating the damped resistance to movement between said sprung and unsprung portions when said demanded force signal is within a predetermined range; and
leveling the attitude of the vehicle by controlling the flow of pressurized fluid between said hydraulic actuator and a central fluid pressure source when said demanded force signal is outside of said predetermined range.

17. A method of dynamically leveling the attitude of a vehicle in response to changes in the dynamic behavior of the sprung and unsprung portions of the vehicle, said method comprising the steps of:
connecting a hydraulic actuator between the sprung and unsprung portions at each corner of the vehicle, said hydraulic actuator having a piston and rod assembly disposed for translational movement within a working chamber filled with damping fluid such that said piston defines first and second portions of said working chamber;
connecting said first portion of said working chamber for each actuator to a closed-loop fluid source having a pump and a reservoir;
connecting first valving means between said fluid source and each of said actuators for controlling the flow of damping fluid between said first portion of said working chamber and said fluid source;
connecting an accumulator to said second portion of said working chamber for each of said actuator;

providing second valving means for controlling the flow of damping fluid between said first and second portions of said working chamber;

sensing the dynamic movement of the sprung and unsprung portions of the vehicle at each corner thereof and generating sensor output signals in response thereto;

calculating a force signal for each actuator in response to said sensor output signals;

actuating said second valving means for generating a desired actuator force in response to said force signal; and actuating said first valving means for providing a fluid communication path between said fluid source and said hydraulic actuator for cumulatively generating said actuator force whenever said force signal is outside of the limits of said second valving means.

18. The method of claim 17, wherein said step of calculating said force signal comprises providing a dynamic leveling control system and a load leveling control system such that said force signal is the sum of an output signal from said dynamic leveling system and an output signal from said load leveling system.

19. A method of adapting the gains of a full feedback control system for an active suspension system, said system having an actuator connected between the sprung and unsprung mass of the vehicle, said method comprising the steps of:

providing a control circuit adapted to receive output signals from sensor means for generating a state variable vector $X_n$ defining the velocity and displacement of the vehicle's sprung and unsprung masses, said control circuit having a feedback gain matrix $G_n$ defining stiffness and damping characteristics based on predetermined vehicle performance requirements so as to generate a demanded output force signal $U = G_n (X_n)$;

identifying disturbances represented by variations in the frequency and amplitude of the vehicle's relative suspension velocity;

calculating a linear combination matrix "G" of a first feedback gain matrix $G_{soft}$ and a second feedback gain matrix $G_{firm}$; and inputting said weighted linear combination "G" into said feedback gain matrix $G_n$ for continuously modifying said demanded output force signal "U".

* * * * *

UNITED STATES PATENT AND TRADEMARK OFFICE
CERTIFICATE OF CORRECTION

PATENT NO. : 5,231,583
DATED : July 27, 1993
INVENTOR(S) : Magnus B. Lizell (Page 1 of 7)

It is certified that error appears in the above-indentified patent and that said Letters Patent is hereby corrected as shown below:

Column 1, line 6,
"07,535,362" should be --07/535,362--.

Column 2, line 43,
"i.e." should be --i.e.,--.

Column 3, line 26,
";" should be --:--.

Column 3, line 43,
"camper" should be --damper--.

Column 4, line 49,
"equation" should be --Equation--.

Column 4, line 50,
"to" should be --of--.

Column 5, line 30,
after "invention", insert --is--.

Column 6, line 8,
"level" should be --leveling--.

Column 7, line 31,
"illustrated" should be --illustrates--.

UNITED STATES PATENT AND TRADEMARK OFFICE
CERTIFICATE OF CORRECTION

PATENT NO. : 5,231,583

DATED : July 27, 1993

INVENTOR(S) : Magnus B. Lizell

It is certified that error appears in the above-identified patent and that said Letters Patent is hereby corrected as shown below:

Column 7, lines 56 - 58,
        delete "By leaving the wheels passively controlled, the required frequency of external energy to compensate for vehicle body motion."

Column 8, line 66,
        "gains" should be --gain--.

Column 10, line 28,
        "FIG." should be --FIGS.--.

Column 11, line 11,
        "reason" should be --reasons--.

Column 11, line 32,
        "location" should be --Location--.

Column 11, line 41,
        "Z" should be --$\dot{Z}$-- (first occurrence).

Column 11, line 42,
        "θ" should be --$\dot{\theta}$-- (first occurrence).

Column 11, line 43,
        "Φ" should be --$\dot{\Phi}$-- (first occurrence).

Column 12, line 33,
        "seven(7)" should be --seven (7)--.

UNITED STATES PATENT AND TRADEMARK OFFICE
CERTIFICATE OF CORRECTION

PATENT NO. : 5,231,583

DATED : July 27, 1993

INVENTOR(S) : Magnus B. Lizell

It is certified that error appears in the above-identified patent and that said Letters Patent is hereby corrected as shown below:

Column 12, line 34,
"represents" should be --represent--.

Column 13, line 6,
"feed back" should be --feedback--.

Column 13, line 21,
"by(-GX)" should be --by (-GX)--.

Column 14, line 21,
"Column" should be --Columns--.

Column 14, line 31,
"represent" should be --represents--.

Column 14, line 56,
"910)" should be --(10)--.

Column 14, line 64,
"0.3,and" should be --0.3, and--.

Column 15, line 34,
"$\ddot{Q}$" should be --$\ddot{\underline{Q}}$--.

Column 15, line 59,
"$x_7^{\char`\^}$" should be --$\hat{x}_7$--.

Column 15, line 60,
"$\ddot{Q}$" should be --$\ddot{\underline{Q}}$--.

UNITED STATES PATENT AND TRADEMARK OFFICE
CERTIFICATE OF CORRECTION

PATENT NO. : 5,231,583                        (Page 4 of 7)
DATED : July 27, 1993
INVENTOR(S) : Magnus B. Lizell It is certified that error appears in the above-indentified patent and that said Letters Patent is hereby corrected as shown below:

Column 15, line 63,
    "$x_1^\wedge$" should be --$\hat{x}_1$--.

Column 16, line 24,
    "curve"w"" should be --curve "w"--.

Column 16, line 40,
    "$\ddot{Q}$" should be --$\ddot{\mathbb{Q}}$--.

Column 16, line 45,
    "filler 22" should be --filter 222--.

Column 17, line 21,
    after "the", insert --same--.

Column 17, line 67,
    "ad" should be --and--.

Column 19, line 32,
    "$g_{soft}$" should be --$G_{soft}$--.

Column 19, line 35,
    "($\alpha$lf, $\alpha$rf,$\alpha$rr, $\alpha$lr)," should be --($\alpha$lf, $\alpha$rf, $\alpha$rr, $\alpha$lr),--.

Column 19, line 46,
    "$g = (1 - \alpha) g_{soft} + \alpha g_{firm}$" should be --$G = (1 - \alpha) G_{soft} + \alpha G_{firm}$--.

UNITED STATES PATENT AND TRADEMARK OFFICE
CERTIFICATE OF CORRECTION

PATENT NO. : 5,231,583

DATED : July 27, 1993

INVENTOR(S) : Magnus B. Lizell

It is certified that error appears in the above-identified patent and that said Letters Patent is hereby corrected as shown below:

Column 19, line 65,
    after "to", delete "the".

Column 20, line 20,
    "further more" should be --furthermore--.

Column 20, line 22,
    "High pass" should be --High-pass--.

Column 20, line 31,
    "high pass" should be --high-pass--.

Column 20, lines 33 - 34,
    "low pass" should be --low-pass--.

Column 21, line 45,
    "dependant" should be --dependent--.

Column 21, line 57,
    "$P_{acc}$" should be --$p_{acc}$--.

Column 22, line 26,
    "$x_7^\wedge$" should be --$\hat{x}_7$--.

Column 22, line 47,
    "the" (first occurrence) should be --that--.

Column 24, line 63,
    "i sin" should be --is in--.

UNITED STATES PATENT AND TRADEMARK OFFICE
CERTIFICATE OF CORRECTION

PATENT NO. : 5,231,583
DATED : July 27, 1993
INVENTOR(S) : Magnus B. Lizell

It is certified that error appears in the above-identified patent and that said Letters Patent is hereby corrected as shown below:

Column 25, line 2,
"of" should be --to--.

Column 25, line 17,
after "force", insert --is--.

Column 25, line 56,
"quad-ant" should be --quadrant--.

Column 25, line 68,
"in" should be --is--.

Column 26, line 42,
"30" should be --130--.

Column 26, line 63,
"$P_{system}$" (second occurrence) should be --$p_{system}$--.

Column 26, line 65,
"the" should be --The--.

Column 27, line 10, claim 1,
"spring" should be --sprung--.

UNITED STATES PATENT AND TRADEMARK OFFICE
CERTIFICATE OF CORRECTION

PATENT NO. : 5,231,583

DATED : July 27, 1993

INVENTOR(S) : Magnus B. Lizell

It is certified that error appears in the above-indentified patent and that said Letters Patent is hereby corrected as shown below:

Column 29, line 4, claim 12,
"$S_n$" should be --$X_n$--.

Signed and Sealed this

Thirtieth Day of August, 1994

Attest:

BRUCE LEHMAN

*Attesting Officer*   *Commissioner of Patents and Trademarks*